United States Patent
Ramasubramanian

(10) Patent No.: US 10,684,430 B2
(45) Date of Patent: *Jun. 16, 2020

(54) PROTECTIVE FIBER OPTIC TERMINATION, SYSTEM, AND METHOD OF USING SAME

(71) Applicant: Ormond Energy Innovations Inc., Katy, TX (US)

(72) Inventor: Srikanth Ramasubramanian, Katy, TX (US)

(73) Assignee: ORMOND ENERGY INNOVATIONS INC., Katy, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/539,938

(22) Filed: Aug. 13, 2019

(65) Prior Publication Data

US 2019/0369340 A1 Dec. 5, 2019

Related U.S. Application Data

(63) Continuation of application No. 16/083,838, filed as application No. PCT/US2017/022807 on Mar. 16, 2017, now Pat. No. 10,422,969.

(Continued)

(51) Int. Cl.
*G02B 6/50* (2006.01)
*G02B 6/42* (2006.01)
(Continued)

(52) U.S. Cl.
CPC ......... *G02B 6/4248* (2013.01); *G02B 6/3816* (2013.01); *G02B 6/4292* (2013.01);
(Continued)

(58) Field of Classification Search
USPC .................................................. 385/89–94
See application file for complete search history.

(56) References Cited

U.S. PATENT DOCUMENTS

| 3,951,515 A | 4/1976 | Allard |
| 4,217,028 A | 8/1980 | Reh et al. |

(Continued)

FOREIGN PATENT DOCUMENTS

| EP | 0804747 A2 | 11/1997 |
| EP | 1222484 A2 | 7/2002 |

(Continued)

OTHER PUBLICATIONS

Christiansen et al. Fiber Optic Terminations for Subsea Applications, SEACON Advanced Products, (Jun. 2001), pp. 1-8.

(Continued)

*Primary Examiner* — Eric Wong
(74) *Attorney, Agent, or Firm* — J L Salazar

(57) ABSTRACT

A fiber optic termination sealingly connects to a cable which includes a casing having a cable tube and optical fibers. The termination includes a sealed housing, a manifold, a connector and termination tubes. The housing has an inlet to sealably receive the cable. The fibers extend from an end of the cable into a sealed chamber of the housing. The manifold is positionable in the housing, and has an inlet to receive the fibers and sealed passages shaped to distribute the fibers therethrough the connector includes contacts communicatively connectable to equipment and the fibers. The termination tubes are positionable within the chamber of housing, and have an entry end sealingly connectable to an end of the cable tube and a contact end sealingly connectable to the contacts. The manifold sealingly connectable to the termination tubes to define a sealed channel the optical fibers are disposable through the sealed channel whereby the housing and the termination tubes define a multi-layer protective environment for sealingly encasing the optical fibers.

20 Claims, 26 Drawing Sheets

Related U.S. Application Data

(60) Provisional application No. 62/309,598, filed on Mar. 17, 2016.

(51) Int. Cl.
  G02B 6/38 (2006.01)
  G02B 6/44 (2006.01)
  E21B 41/00 (2006.01)

(52) U.S. Cl.
  CPC ......... G02B 6/4428 (2013.01); G02B 6/4472 (2013.01); E21B 41/0007 (2013.01); G02B 6/3817 (2013.01)

(56) References Cited

U.S. PATENT DOCUMENTS

| | | |
|---|---|---|
| 4,360,729 A | 11/1982 | Harvey et al. |
| 4,537,468 A | 8/1985 | Degoix et al. |
| 4,545,645 A | 10/1985 | Mignien |
| 4,561,830 A | 12/1985 | Bradley |
| 4,580,874 A | 4/1986 | Winter et al. |
| 4,598,290 A | 7/1986 | Collins et al. |
| 4,753,500 A | 6/1988 | Guazzo |
| 4,810,277 A | 3/1989 | Waitl et al. |
| 4,834,479 A | 5/1989 | Adl |
| 4,948,377 A | 8/1990 | Cairns |
| 5,013,124 A | 5/1991 | Focht |
| 5,042,902 A | 8/1991 | Huebscher et al. |
| 5,048,921 A | 9/1991 | Jones et al. |
| 5,076,657 A | 12/1991 | Toya et al. |
| 5,083,875 A | 1/1992 | Cedrone |
| 5,341,448 A | 8/1994 | Huebscher |
| 5,515,473 A | 5/1996 | Yamauchi et al. |
| 5,557,697 A | 9/1996 | Yoshie |
| 5,642,451 A | 6/1997 | Kennedy et al. |
| 5,838,857 A | 11/1998 | Niekrasz |
| 6,017,227 A | 1/2000 | Cairns et al. |
| 6,028,974 A | 2/2000 | Shyu et al. |
| 6,338,579 B1 | 1/2002 | Winiarski |
| 6,584,253 B2 | 6/2003 | Kordahi et al. |
| 6,612,369 B1 | 9/2003 | Rocha et al. |
| 6,796,821 B2 | 9/2004 | Cairns et al. |
| 6,929,404 B2 | 8/2005 | Jones et al. |
| 7,004,638 B2 | 2/2006 | Nicholson |
| 7,182,617 B1 | 2/2007 | Cairns et al. |
| 7,338,215 B2 | 3/2008 | Reynolds |
| 7,364,448 B2 | 4/2008 | Cairns et al. |
| 7,618,198 B2 | 11/2009 | Baxter et al. |
| 7,648,285 B2 | 1/2010 | Maletzky et al. |
| 7,803,334 B1 | 9/2010 | Hoehn et al. |
| 8,266,303 B2 | 9/2012 | Black et al. |
| 8,634,690 B2 | 1/2014 | Landaas et al. |
| 8,734,026 B2 | 5/2014 | Nagengast et al. |
| 10,422,969 B2 | 9/2019 | Ramasubramanian |
| 2011/0129187 A1 | 6/2011 | Toth |
| 2014/0093247 A1 | 4/2014 | Jamtveit et al. |
| 2014/0233898 A1 | 8/2014 | Kimbrell et al. |
| 2015/0167782 A1 | 6/2015 | Drake |
| 2015/0280355 A1 | 10/2015 | Hatcher et al. |
| 2016/0004016 A1 | 1/2016 | Zimmel et al. |
| 2017/0022807 A1 | 1/2017 | Dursun et al. |
| 2018/0083705 A1 | 3/2018 | Villmark |

FOREIGN PATENT DOCUMENTS

| | | |
|---|---|---|
| EP | 1291694 A2 | 3/2003 |
| WO | 0237152 A1 | 5/2002 |

OTHER PUBLICATIONS

Guide to Fiber Optics & Premises Cabling. The Fiber Optic Association, Inc. 1999-2014. pp. 1-16.
Naudi et al. Long-Range Pipeline Monitoring by Distributed Fiber Optic Sensing, Journal of Pressure Vessel Technology, (2010), vol. 132 pp. 1-9.
Munier et al., BP GOM: Next Generation Offshore Fiber ON&T. Oct./Nov. 2008. vol. 14, Issue 7; p. 44-45.
PCT International Search Report and Written Opinion issued in Application No. PCT/US2017/022807 dated Jun. 6, 2017, 15 pages.
Canadian Examiner's Office Action dated Jul. 10, 2018 for Canadian Application No. 3,009,529 4 pages.
Response to Canadian Office Action dated Sep. 7, 2018 for Canadian Application No. 3,009,529, 44 pages.
Canadian Notice of Allowance dated Sep. 17, 2018 for Canadian Application No. 3,009,529, 1 page.
European Examiner's Office Action dated Nov. 7, 2018 for European Application No. 17713862.5, 3 pages.
PCT Notification of Transmittal of International Search Report and the Written Opinion of the International Searching Authority dated Jan. 31, 2019, issued from the International Searching Authority in related PCT Application No. PCT/US2018/058301, (14 pages).

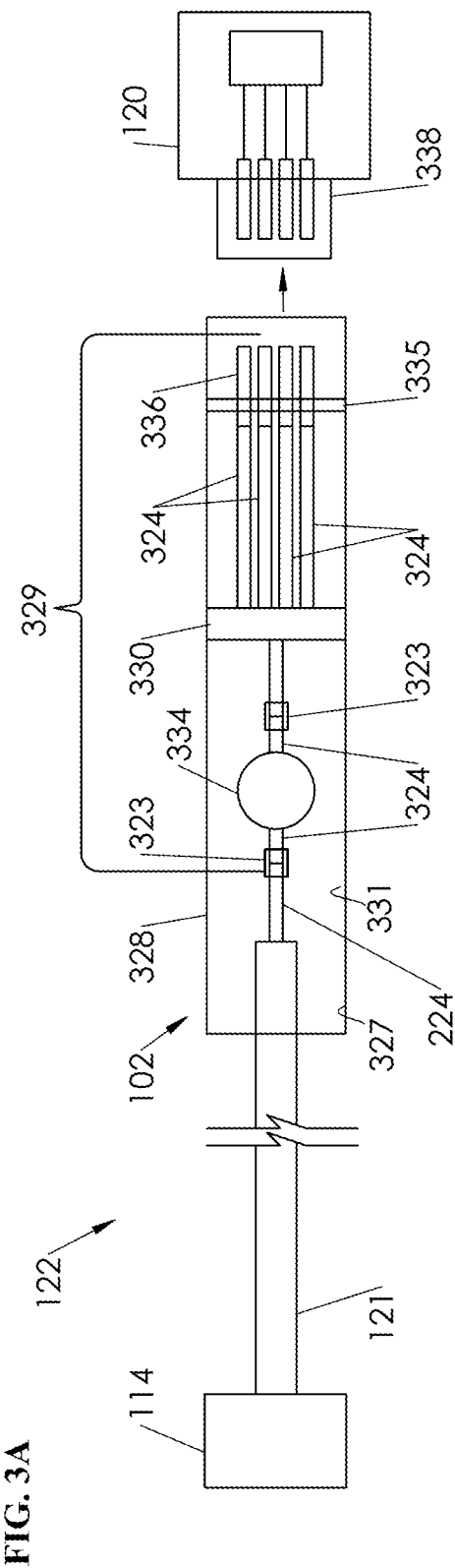

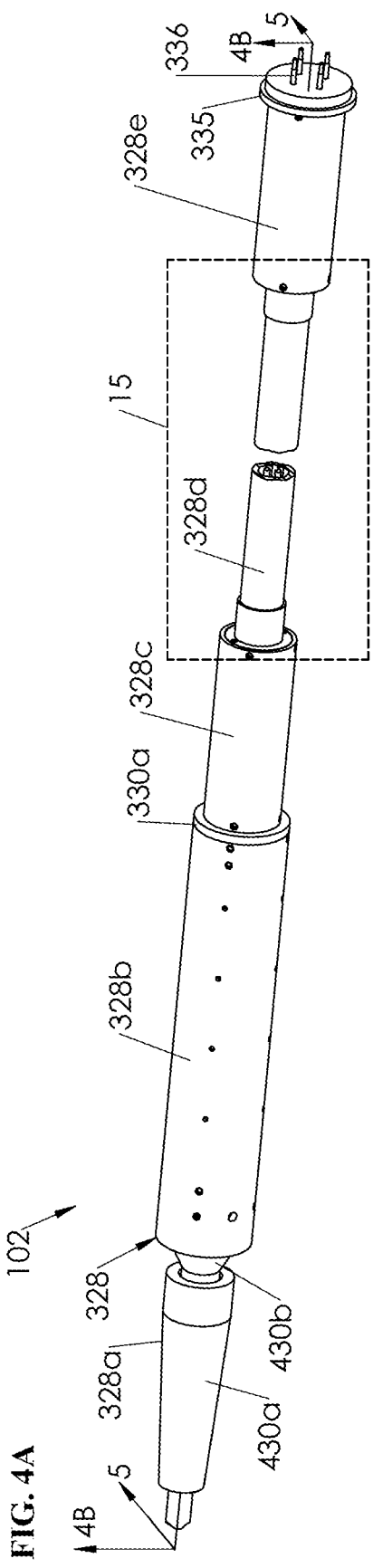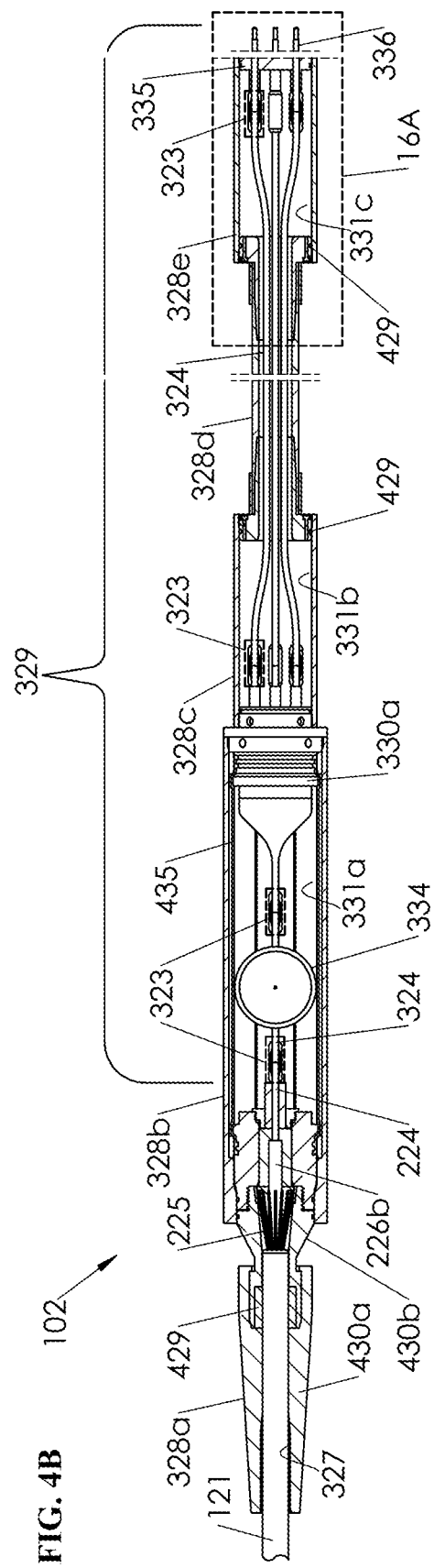

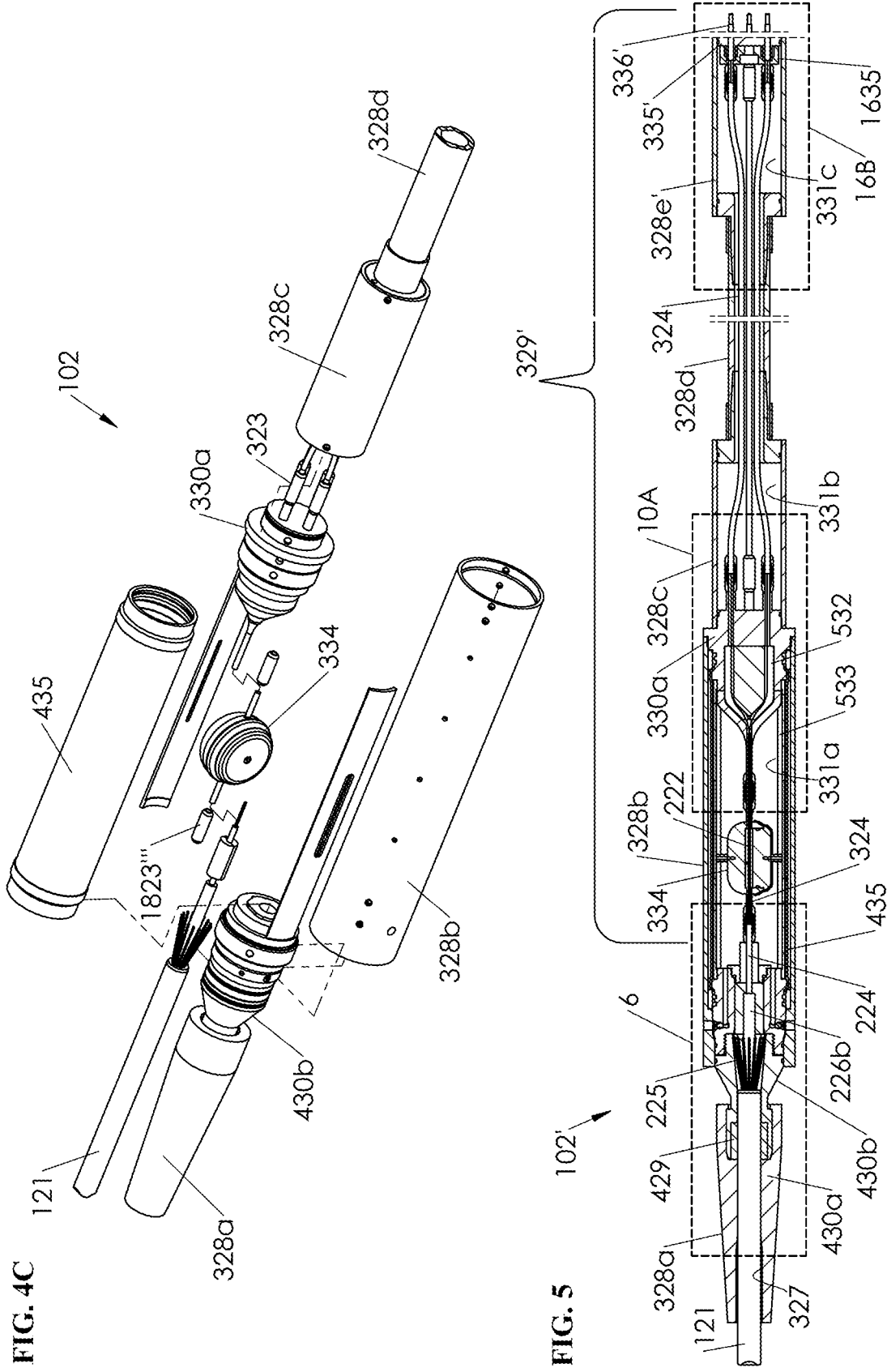

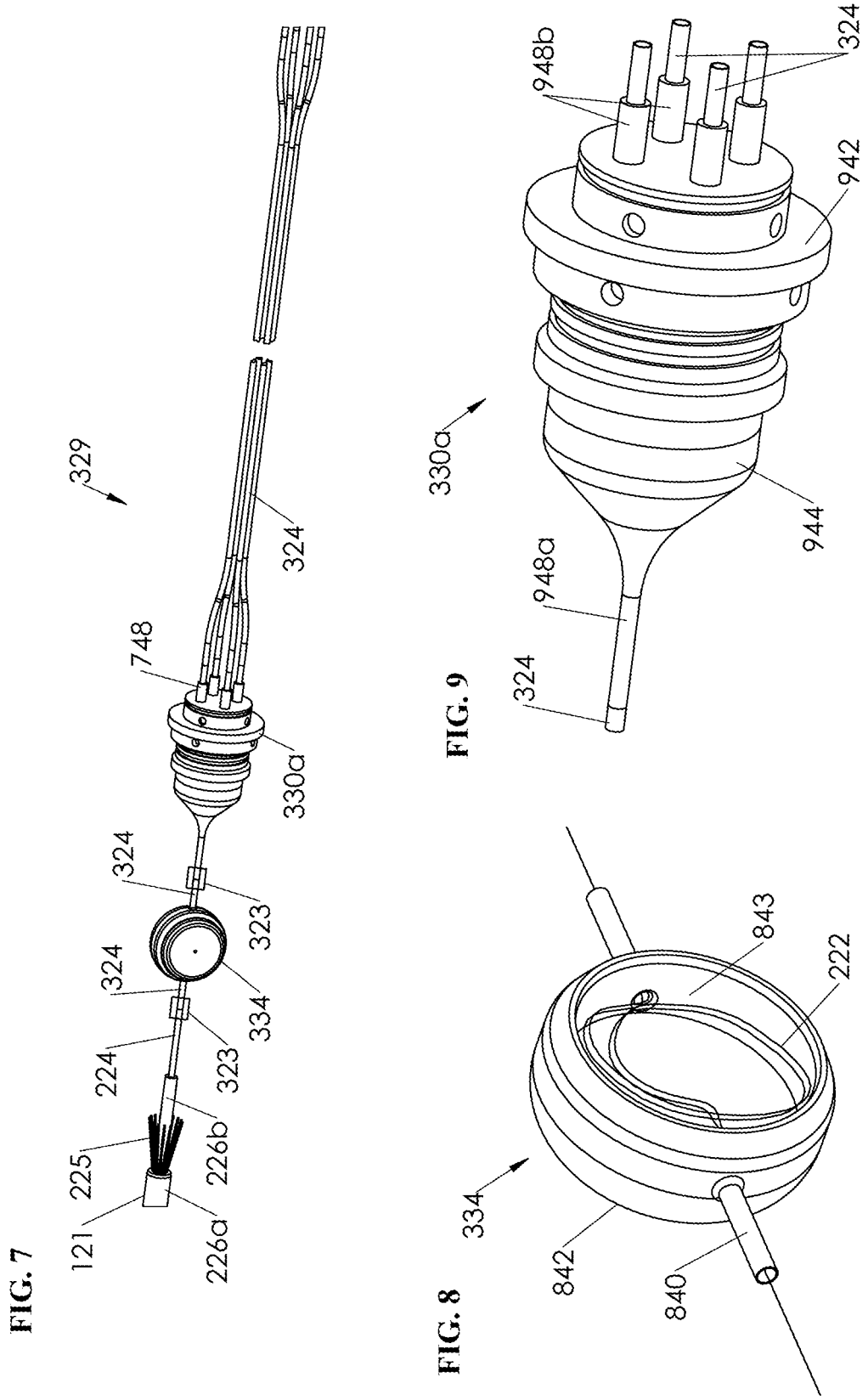

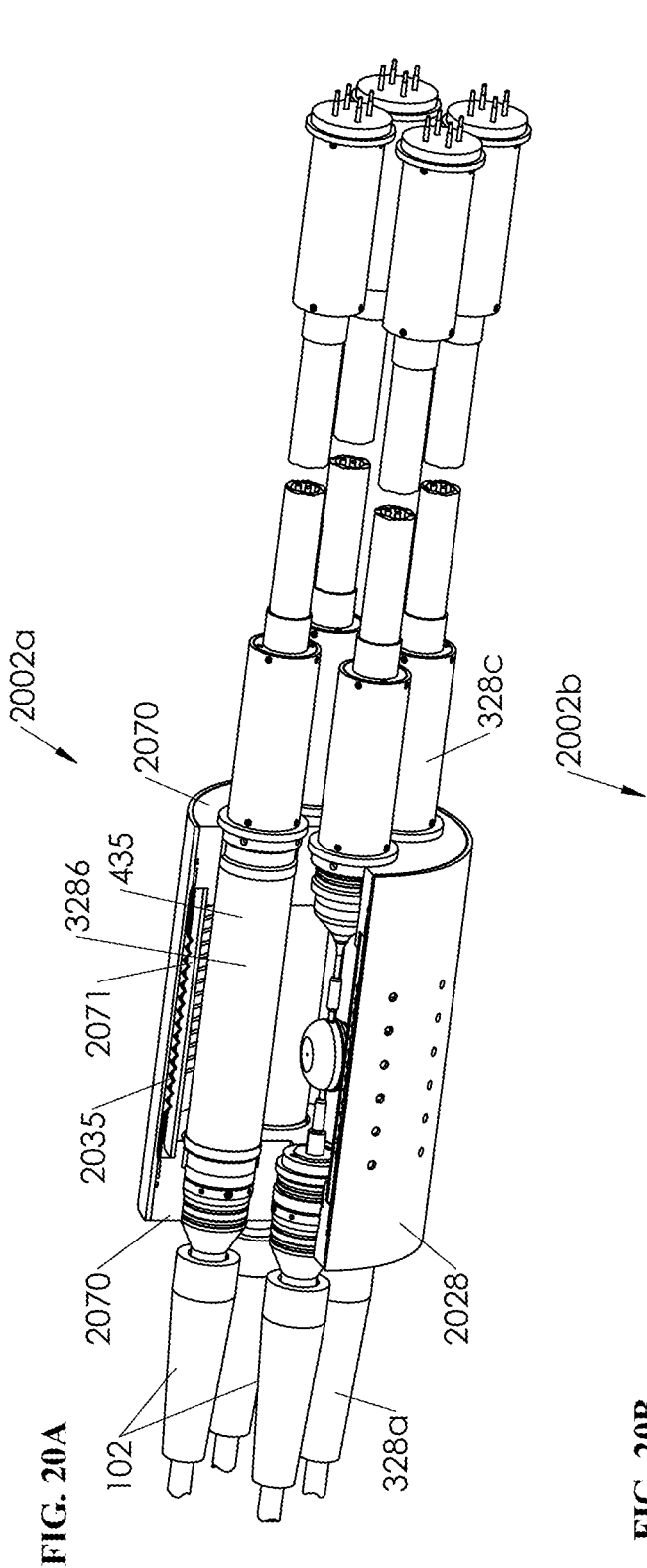

FIG. 21

2100 METHOD OF ASSEMBLING THE PROTECTIVE FIBER OPTIC TERMINATION

2181 {
- 2170 CONNECTING (E.G., BONDING) A RECEIVING PORTION TO A CONNECTING PORTION OF AN OPTICAL CONTACT
- 2172 CONNECTING OPTICAL FIBERS TO THE OPTICAL CONTACTS
- 2174 BONDING THE OPTICAL FIBERS TO THE OPTICAL CONTACTS
- 2176 PASSING THE BONDED OPTICAL FIBERS THROUGH TERMINATION TUBE(S)
- 2178 ADHERING THE BONDED OPTICAL FIBERS TO THE OPTICAL CONTACTS
- 2180 SECURING THE CONNECTOR HOUSING AND THE FLEXIBLE HOUSING ABOUT THE ADHERED OPTICAL FIBERS AND OPTICAL CONTACT

2189 {
- 2182 PASSING AN OPTICAL CABLE INTO THE HOUSING(S)
- 2184 EXPOSING AN INNER LAYER OF THE OPTICAL CABLE
- 2186 PASSING THE INNER LAYER OF THE OPTICAL CABLE INTO THE STORAGE BASE
- 2187 EXPOSING THE STORAGE BASE AND THE MANIFOLD

2188 PASSING THE OPTICAL FIBERS THROUGH THE MANIFOLD AND INTO THE STORAGE BASE

2190 SPLICING THE OPTICAL FIBERS FROM THE CONTACT SUBASSEMBLY WITH OPTICAL FIBERS IN THE INNER LAYER OF THE OPTICAL CABLE TOGETHER WITHIN THE STORAGE BASE

2192 SEALING THE HOUSINGS ABOUT THE SPLICED OPTICAL FIBERS

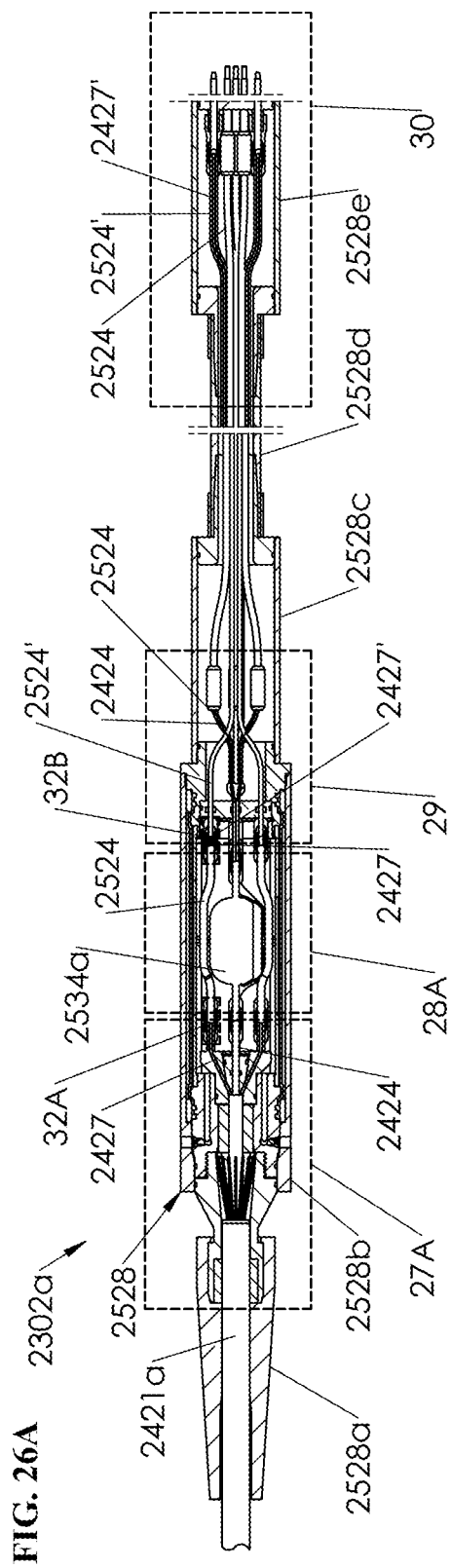
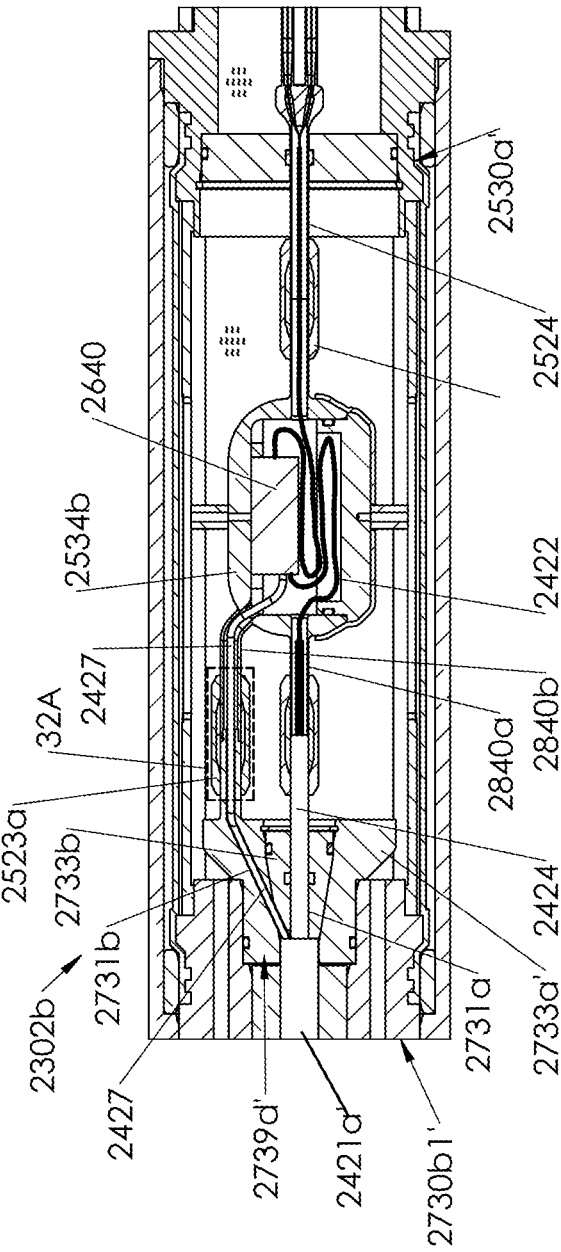
FIG. 26A
FIG. 26B

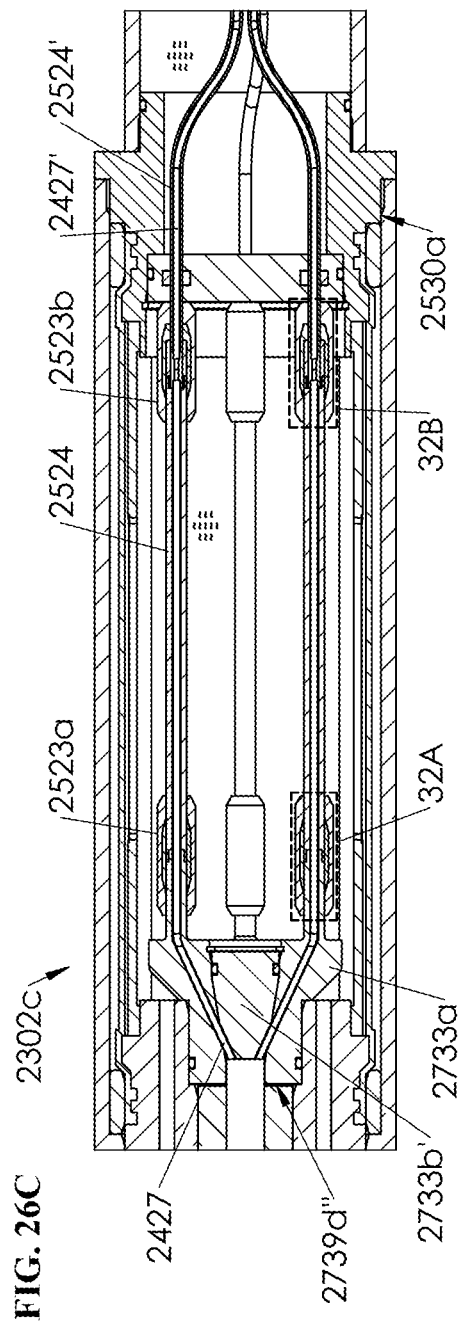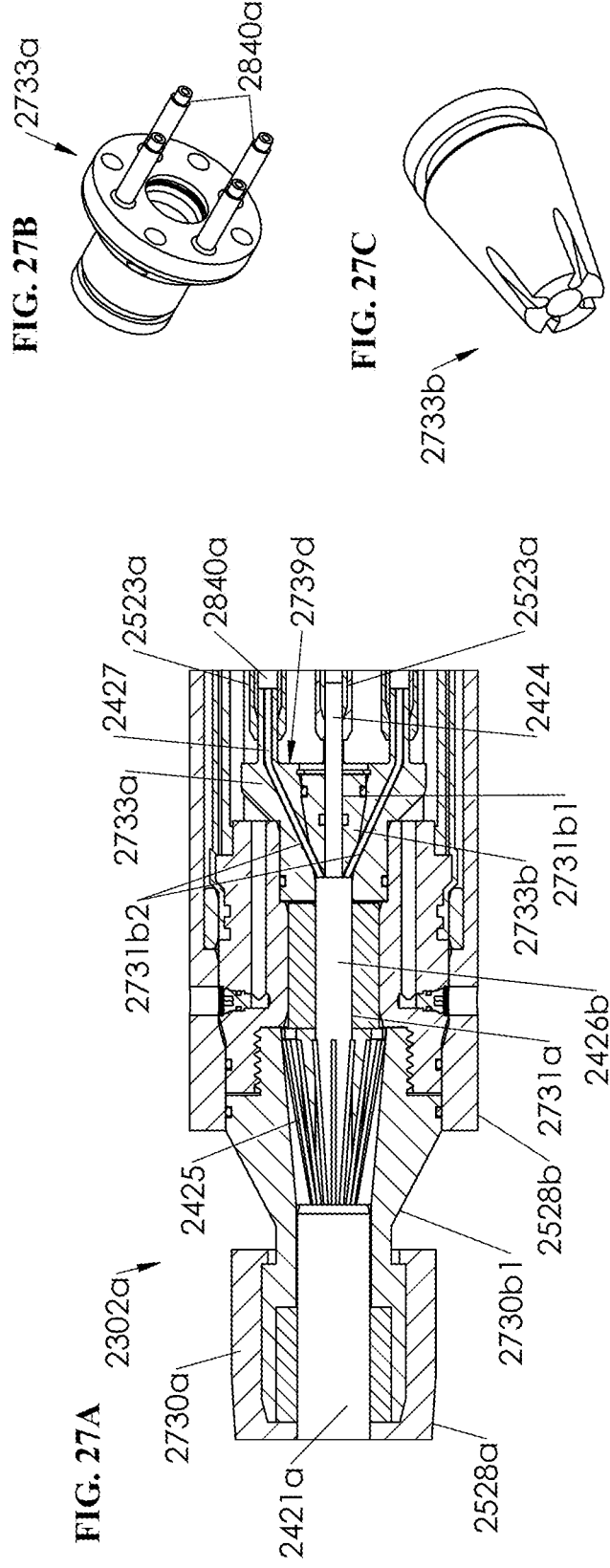

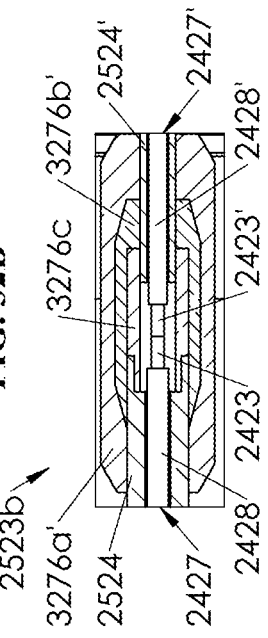
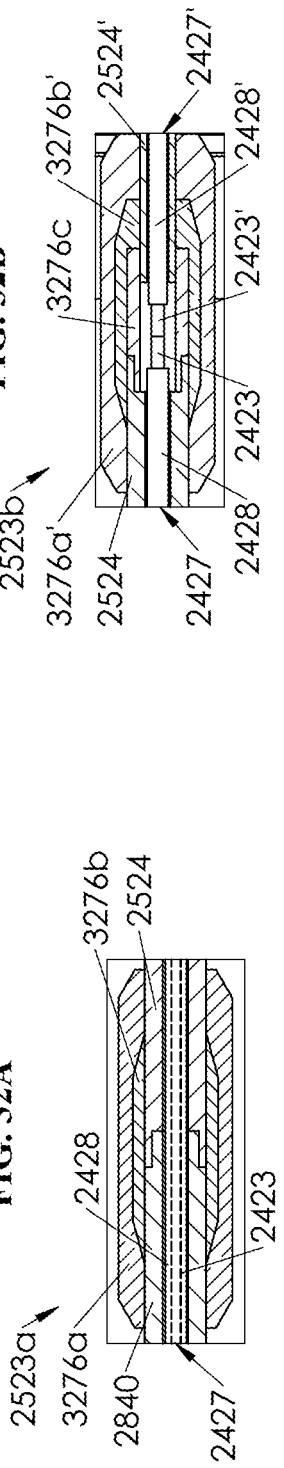
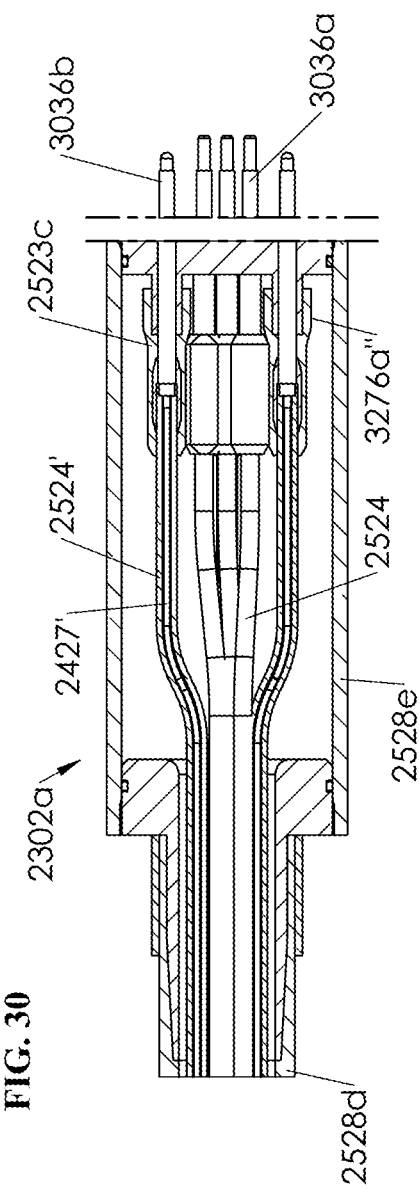
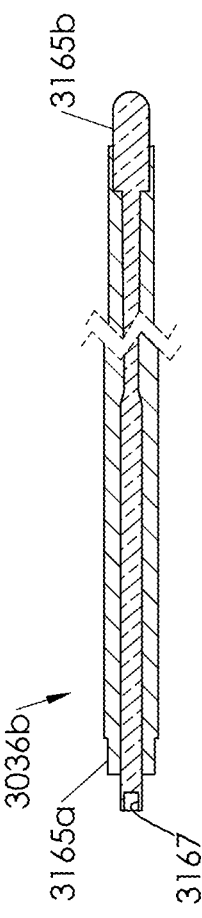

FIG. 34A

3400a METHOD OF ASSEMBLING A MULTI-LINK TERMINATION

3470 CONNECTING (E.G., BONDING) A RECEIVING PORTION TO A CONNECTING PORTION OF AN OPTICAL CONTACT AND/OR ELECTRICAL CONTACT

3472 CONNECTING OPTICAL FIBERS TO THE OPTICAL CONTACTS AND/OR ELECTRICAL WIRES TO ELECTRICAL CONTACTS

3474 BONDING THE OPTICAL FIBERS TO THE OPTICAL CONTACTS AND/OR JOINING THE ELECTRICAL WIRES TO THE ELECTRICAL CONTACTS

3476 PASSING THE BONDED OPTICAL FIBERS THRU TERMINATION TUBE(S) AND/OR PASSING THE JOINED ELECTRICAL WIRES THRU TERMINATION TUBE(S)

3478 ADHERING THE BONDED OPTICAL FIBERS TO THE OPTICAL CONTACTS AND ELECTRICAL WIRES TO THE ELECTRICAL CONTACTS

3480 SECURING THE CONNECTOR HOUSING AND THE FLEXIBLE HOUSING ABOUT THE ADHERED OPTICAL FIBERS AND OPTICAL CONTACT, ELECTRICAL WIRES AND ELECTRICAL CONTACT

3482 PASSING A MULTI-LINK CABLE INTO THE HOUSING(S)

3484 EXPOSING AN INNER LAYER OF THE MULTI-LINK CABLE

3486a PASSING THE OPTICAL FIBER CABLE TUBE OF THE MULTI-LINK CABLE INTO THE STORAGE BASE

3486b PASSING THE ELECTRICAL WIRE OF THE ELECTRO-OPTIC INTO THE TERMINATION TUBE AND/OR STORAGE BASE

3487 EXPOSING THE STORAGE BASE AND THE MANIFOLD

3488a PASSING THE OPTICAL FIBERS FROM OPTICAL CONTACTS THROUGH THE MANIFOLD AND INTO THE STORAGE BASE

3488b PASSING THE ELECTRICAL WIRES FROM ELECTRICAL CONTACTS THROUGH THE MANIFOLD PLATE AND INTO TERMINATION TUBES

3490a SPLICING THE OPTICAL FIBERS FROM THE OPTICAL CONTACT WITH OPTICAL FIBERS IN THE CABLE TUBE OF THE MULTI-LNK CABLE WITHIN THE STORAGE BASE AND SEALING THE STORAGE BASE

3490b SPLICING THE ELECTRICAL WIRES FROM THE ELECTRICAL CONTACT WITH ELECTRICAL WIRES IN THE MULTI-LINK CABLE WITHIN THE TERMINATION TUBES AND SEALING THE TERMINATION TUBE JOINT

3492 SEALING THE HOUSINGS ABOUT THE SPLICED OPTICAL FIBERS AND ELECTRICAL WIRES WITH FLUID FILL AND SEALS

FIG. 34B
3400b METHOD OF USING A MULTI-LINK TERMINATION

3471 PROVIDING A FIBER OPTIC TERMINATION COMPRISING A SEALED HOUSING, A MANIFOLD, TERMINATION TUBES, AND OPTICAL CONTACTS

3473 PASSING THE OPTICAL FIBERS INTO AN ENTRY END OF THE SEALED HOUSING

3475 DISTRIBUTING THE OPTICAL FIBERS THROUGH THE MANIFOLD

3477 COMMUNICATIVELY CONNECTING THE OPTICAL FIBERS TO THE CONTACTS

3479 COMMUNICATIVELY CONNECTING ADDITIONAL OPTICAL FIBERS BETWEEN THE OPTICAL FIBERS AND THE CONTACTS AND/OR AN ADDITIONAL ELECTRICAL WIRE BETWEEN THE ELECTRICAL WIRE AND THE CONTACTS

3481 SEALINGLY ENCASING THE OPTICAL FIBERS IN THE TERMINATION TUBES AND SEALINGLY CONNECTING THE TERMINATION TUBES WITH AT LEAST ONE CABLE TUBE, THE MANIFOLD, AND THE CONTACTS

3483 COMMUNICATIVELY CONNECTING THE OPTICAL CONTACTS TO THE EQUIPMENT

3485 PASSING SIGNALS BETWEEN THE EQUIPMENT AND THE CABLE VIA THE OPTICAL FIBERS.

PROTECTIVE FIBER OPTIC TERMINATION, SYSTEM, AND METHOD OF USING SAME

CROSS-REFERENCE TO RELATED APPLICATIONS

This application claims the benefit of U.S. Provisional Application 62/309,508, filed Mar. 17, 2016, now expired; PCT/US2017/022807, Mar. 16, 2017, now expired; and U.S. application Ser. No. 16/083,838, filed Sep. 10, 2018, currently co-pending, and of which this application is a continuation. The entire contents of each of these applications are incorporated by reference herein.

BACKGROUND

The present disclosure relates generally to communication technology. More specifically, the present disclosure relates to optical and/or electrical communication usable at facilities, such as offshore wellsite and/or other harsh environments.

Fiber optics are used at facilities, such as wellsites, for providing communication between various equipment. For example, fiber optics have been used at offshore wellsites for providing communication between surface and subsea equipment. Offshore wellsites have various equipment for performing wellsite operations at offshore locations. Such wellsite operations involve underwater or subsea applications, such as offshore seabed surveys, oceanographic pursuits, marine telecommunication, and well control, communication, and sensing systems. Such wellsite operations may occur under harsh conditions at various water depths.

Various systems, such as conventional copper based communication systems, have been used for communicating about offshore facilities. In harsh environment applications, such as offshore oil and gas fields, fiber optics have been employed for communication with sensors and control systems involved in exploration and production of hydrocarbons.

Fiber optics use optical fibers to transmit light between locations for the transmission of data signals. Fiber optics technology has been developed to facilitate communication at enhanced bandwidth connections over distances. Examples of fiber optic technology are provided in Patent/ Application Nos. U.S. Pat. No. 4,598,290, US20140233898; U.S. Pat Nos. 6,796,821, 4,545,645, 6,584,253, 6,028,974, 7,338,215, 4,516,830, 5,048,921, 6,338,579, 5,076,657, 4,580,874 and EP1291694, the entire contents of which are hereby incorporated by reference herein.

Despite the advancements in fiber optic technology, there remains a need for communication and/or fiber optic devices, capable of operation in even harsh environments, such as offshore and/or subsea conditions. The present disclosure is directed at providing such needs.

SUMMARY

In at least one aspect, the disclosure relates to a fiber optic termination for communicatively connecting a cable to equipment. The cable comprises a casing having at least one cable tube therethrough. The cable tube has optical fibers extending therethrough. The fiber optic termination comprises a sealed housing, a manifold, a connector, and termination tubes. The sealed housing has an inlet to sealably receive an end of the cable. The optic fibers extend from an end of the cable into a sealed chamber of the sealed housing. The manifold is positionable in the sealed housing, and has an inlet to receive the optical fibers of the cable and sealed passages shaped to distribute the optical fibers therethrough. The connector is positioned about the sealed housing, and comprises contacts communicatively connectable to the equipment and the optical fibers. The termination tubes are positionable within the sealed chamber of the sealed housing, and have an entry end sealingly connectable to an end of the cable tube and a contact end sealingly connectable to the contacts. The manifold is sealingly connectable to the termination tubes to define a sealed channel therethrough. The optical fibers are disposable through the sealed channel whereby the housing and the termination tubes define a multi-layer protective environment for sealingly encasing the optical fibers.

In another aspect, the disclosure relates to a fiber optic system for communicating with equipment. The system comprises a source, a cable, and a fiber optic termination. The cable comprises a casing having at least one cable tube therethrough. The cable tube(s) have optical fibers extending therethrough. The fiber optic termination is for communicatively connecting the at least one cable to equipment. The fiber optic termination comprises a sealed housing, a manifold, a connector, and termination tubes. The sealed housing has an inlet to sealably receive an end of the cable. The optic fibers extend from an end of the cable into a sealed chamber of the sealed housing. The manifold is positionable in the sealed housing, and has an inlet to receive the optical fibers of the cable and sealed passages shaped to distribute the optical fibers therethrough. The connector is positioned about the sealed housing, and comprises contacts communicatively connectable to the equipment and the optical fibers. The termination tubes are positionable within the sealed chamber of the sealed housing, and have an entry end sealingly connectable to an end of the cable tube and a contact end sealingly connectable to the contacts. The manifold is sealingly connectable to the termination tubes to define a sealed channel therethrough. The optical fibers are disposable through the sealed channel whereby the housing and the termination tubes define a multi-layer protective environment for sealingly encasing the optical fibers.

Finally, in another aspect the disclosure relates to a method of communicating between equipment via a cable. The cable comprises a casing having a cable tube therethrough. The cable tube has optical fibers extending therethrough. The method comprises passing the optical fibers from the cable and into an entry end of the sealed housing, distributing the optical fibers through the manifold, communicatively connecting the optical fibers to the contacts, sealingly encasing the optical fibers in the termination tubes and sealingly connecting the termination tubes with the at least one cable tube, the manifold, and/or the optical contacts, communicatively connecting the optical contacts to the equipment, and passing signals between the equipment and the cable via the optical fibers.

BRIEF DESCRIPTION OF THE DRAWINGS

So that the above recited features and advantages of the present disclosure can be understood in detail, a more particular description of the invention, briefly summarized above, may be had by reference to the embodiments thereof that are illustrated in the appended drawings. The appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

FIGS. 3A and 3B are schematic diagrams depicting example configurations of the fiber optic system of FIG. 1, the fiber optic termination including a fiber optic housing, a fiber connection assembly, and an equipment connector.

FIGS. 4A-4C are perspective, longitudinal cross-sectional, and exploded views, respectively, of the fiber optic termination of FIG. 3A.

FIG. 5 is a longitudinal, cross-sectional view of another version of the fiber optic termination of FIG. 4B.

FIG. 7 is a perspective view of the fiber connection assembly of FIG. 4B.

FIG. 8 is a perspective view of a portion of the fiber storage base of FIG. 7.

FIG. 9 is a perspective view of the integral manifold of FIG. 7.

FIGS. 20A and 20B are perspective views of fiber optic termination assemblies comprising a plurality of fiber optic terminations having a dedicated and a combined fiber storage chamber, respectively.

FIG. 21 is a flow chart depicting a method of assembling a protective fiber optic termination.

FIG. 26A is a longitudinal, cross-sectional view of an example electro-optical configuration of the multi-link termination of FIG. 25A.

FIG. 26B is a longitudinal, cross-sectional view of an example processed-optical configuration of the multi-link termination of FIG. 25B.

FIG. 26C is a longitudinal, cross-sectional view of an example electrical configuration of the multi-link termination.

FIG. 27A is a cross-sectional view of an entry portion of the multi-link termination of FIG. 26A including a sealed connector with a multi-link retaining nut.

FIG. 27B is a perspective view of an outer portion of the multi-link retaining nut of FIG. 27A.

FIG. 27C is a perspective view of the inner portion of the multi-link retaining nut of FIG. 27A.

FIG. 30 is a cross-sectional view of a connector portion of the multi-link termination of FIG. 26A having both optical and electrical contacts.

FIG. 31 is a longitudinal, cross-sectional view of the electrical contact of FIG. 30.

FIGS. 32A and 32B are cross-sectional views of the electrical tube joints of FIG. 26A.

FIGS. 34A and 34B are flow charts depicting methods of assembling a protective multi-link termination.

DETAILED DESCRIPTION

Figure 2A:
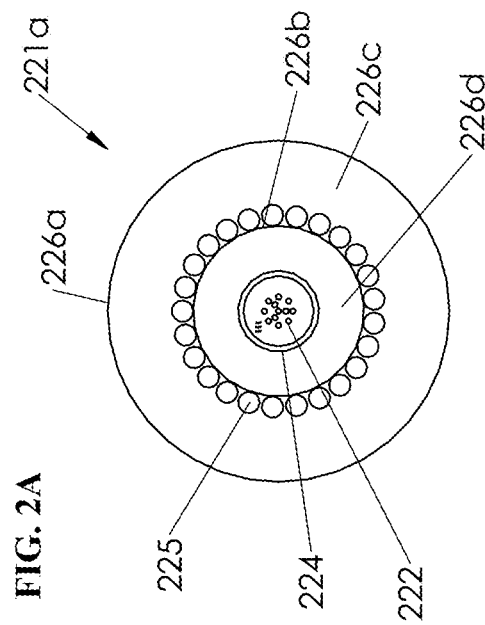
FIGS. 2A and 2B are cross-sectional views of example versions of the fiber optic cable.

The description that follows includes exemplary apparatus, methods, techniques, and/or instruction sequences that embody techniques of the present subject matter. However, it is understood that the described embodiments may be practiced without these specific details.

Fiber Optic Communication

A termination for use in harsh environments, such as offshore underwater oil and gas fields, is provided. A "harsh environment" as used herein refers to any location where the disclosed termination may be used in which conditions may be damaging to the termination (or components thereof), communication cable, communication links carried by the communication cable (e.g., optical fibers, electrical wires, etc.), and/or other portions of the termination and/or equipment usable therewith. The harsh environment may include harsh conditions, such as damaging materials (e.g., corrosive or toxic materials and/or fluids (e.g., seawater, saline, etc.), chemicals (e.g., compositions that are either naturally present or disposed to ambient hydrogen from cathodic protection system and other gases), high pressure and temperature (e.g., above ambient), and/or other conditions that may lead to damage (e.g., functional performance degradation) of the termination, communication cable, and/or other portions of the termination and/or equipment usable therewith suddenly or over time.

The termination includes a sealed housing, a connection assembly, and an equipment connector. The connection assembly may be, for example, a fiber connection assembly including a manifold to distribute links, such as optical fibers of a fiber optic cable, to optical contacts of the equipment connector. The termination may be a fiber optic and/or electrical termination configured to define a sealed chamber to maintain the optical fibers in a protected environment against ambient pressure. The termination may be used to provide a releasable connection to equipment, and/or a modular configuration capable of replacement of portions of the termination system in a sealed environment.

The termination may be provided with modular and/or pressure balanced housings capable of receiving a variety of optical cables for connection to equipment. The termination may have redundant layers, such as housings, bladders, tubes, etc., to isolate the optical fibers from harsh conditions and house the optical fibers in their native environment and/or within a pressure balanced environment. The termination may also be provided with connectable features, such as a storage base, manifold, connector, and optical contacts, which permit pre-assembly of the cable for quick disconnect.

The termination may be capable of operation in even harsh conditions and connectable in a variety of configurations for flexibility of use. The termination may be provided with modular features to enable pre-assembly and replacement of parts as needed. The termination may be configured to provide one or more of the following: protection of cables (e.g., isolation of optical fibers from harsh conditions), maintenance of communication links of the cables in its native environment at connection, housing of the communication links (e.g., optical fibers) where exposed for connection, prevention of degradation of the cable (e.g., optical fibers), sealing about exposed portions of the communication links (e.g., hermetically, redundantly, mechanically), distribution of the communication links for contact, reduced assembly size, efficient manufacture, usability with existing commercial components, manufacturing flexibility and efficiency, facilitation of assembly, storage of optical fibers, higher bandwidth, longer optical fiber communication distance, lower cost, reduction in electromagnetic interference, etc.

Wellsite Environment

Figure 1:
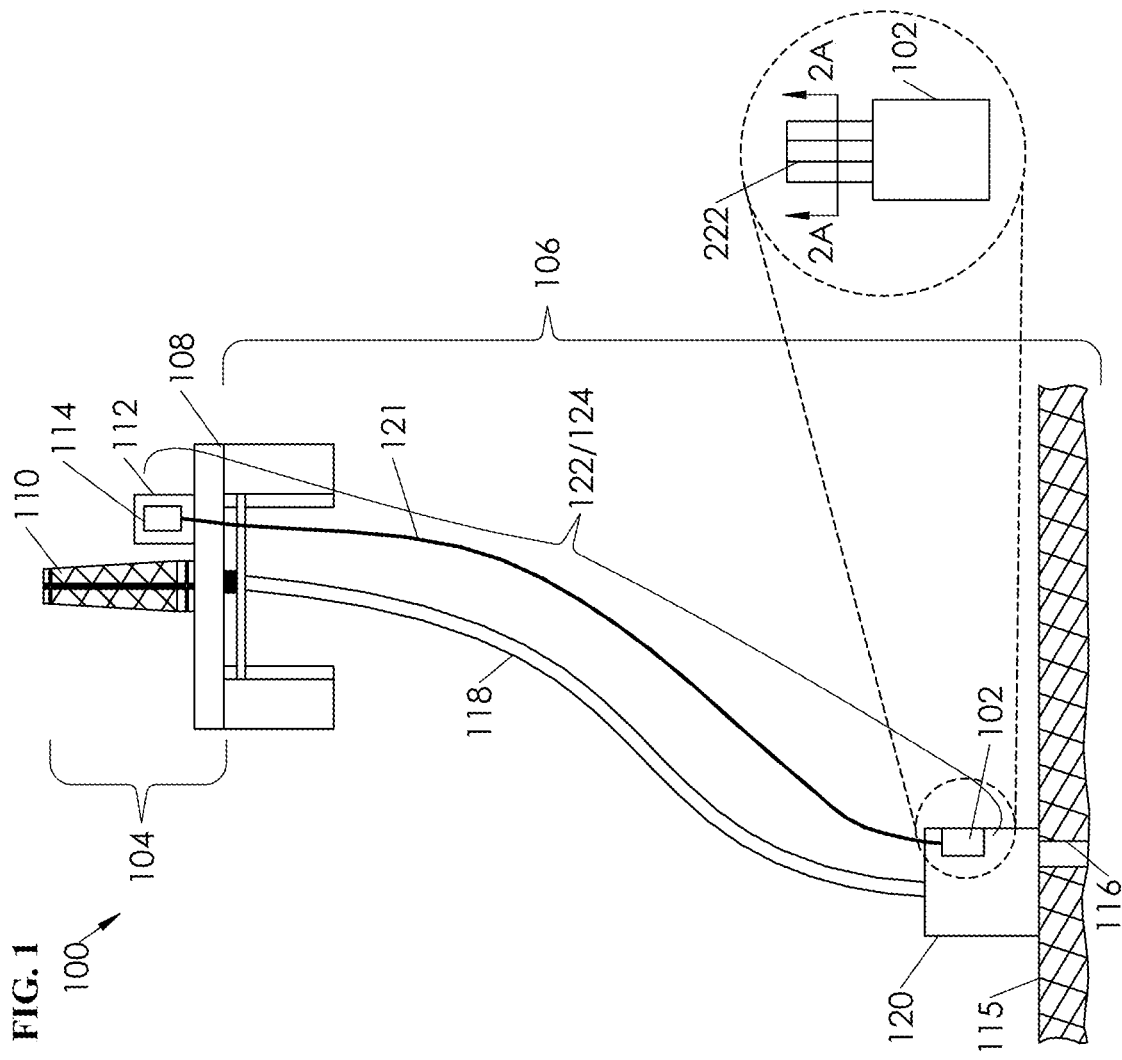
FIG. 1 is a schematic diagram depicting an offshore well with a fiber optic system including a fiber optic source, fiber optic cable, and a protective fiber optic termination.

FIG. 1 depicts an example environment in which various terminations, such as a fiber optic termination 102, may be used. While an offshore wellsite 100 is depicted, the fiber optic termination 102 may be used in a variety of applications, such as applications in any harsh or non-harsh environment. In the example shown, the wellsite 100 includes surface equipment 104 and subsea equipment 106. Also, while FIG. 1 depicts a fiber optic termination 102, other terminations disclosed herein may be used.

The surface equipment 104 includes a platform 108, a rig 110, and a surface unit 112. The rig 110 may optionally be placed on an offshore vessel, an onshore rig site, or other location. The surface unit 112 may be an operator's facility including a central processing unit (CPU) and associated electronics (e.g., database, power, communication, control, and/or other devices). The surface unit 112 may also include a source 114 usable with the fiber optic termination 102 for communication about the wellsite.

The subsea equipment 106 includes a riser 118, sea floor equipment 120, and a fiber optic system 122 including the fiber optic termination 102. The riser 118 extends from the rig 110 to the wellbore 116 for passing fluid therebetween. The riser 118 may have conduits (e.g., choke and kill lines) and/or other equipment usable therewith.

The sea floor equipment 120 is positioned on the sea floor 115 about the wellbore 116 for performing wellsite operations. The sea floor equipment 120 may include a variety of equipment, such as a blowout preventer, low riser marine package (LRMP), a production tree, subsea distribution, and/or other devices used for performing wellsite operations.

Communication couplings 124 may be provided about the wellsite 100 for passing data, power, control, and/or other signals therebetween. Communication couplings may be provided with on or offsite locations for operating the various equipment. The fiber optic system 122 may be usable as one or more of the communication couplings 124 for communication about the wellsite. The fiber optic system 122 may be used to provide the communication coupling between the various equipment above the wellsite, such as the sea floor equipment 120 and/or the surface unit 112, for passing data therebetween. The fiber optic system 122 may be part of or separate from the communication couplings 124.

The fiber optic system 122 includes one or more fiber optic cables 121 and/or fiber optic terminations 102. The fiber optic system 122 may be coupled between the source 114 and the sea floor equipment 120 for communication therebetween. The fiber optic termination 102 may be positioned about (e.g., coupled to or positioned in) the surface unit 112 and/or the sea floor equipment 120 (e.g., near or away from the wellbore, e.g., at subsea distribution equipment). The fiber optic termination 102 may also be coupled to the source 114 and/or other surface equipment 104 by the fiber optic cable 121 for operation therewith. The fiber optic cable 121 may be connected between the source 114 and the fiber optic termination 102 and/or between the sea floor equipment 120 and the fiber optic termination 102 for passing signals therebetween.

The source 114 may have a laser to pass light through the fiber optic cable 121 for measuring wellsite parameters as described further herein. The CPU and/or electronics at the surface unit 112 may be used for sending signals (e.g., command, control, etc.) and/or receiving signals (e.g., measured data) from the fiber optic system 122 and/or the source 114.

The fiber optic termination 102 may be a variety of devices capable of connecting the fiber optic cable 121 to the wellsite equipment for operation (e.g., communication) therewith. For example, the fiber optic termination 102 may be a conventional termination usable with loose tube type optical cables. At least some such conventional terminations may expose optical fibers from a tube of the fiber optic cable in a compartment maintained at atmospheric pressure. Examples of conventional terminations are provided in US Patent/Application Nos. U.S. Pat. No. 4,598,290, US20140233898; U.S. Pat. Nos. 6,796,821, 4,545,645, 6,584,253, 6,028,974, 7,338,215, 4,516,830, and 5,048,921, previously incorporated by reference herein.

In another example, the fiber optic termination 102 may be a protective fiber optic termination provided with a housing having multiple barriers and sealed at atmospheric pressure. This protective fiber optic termination may be used to maintain a pressure within the termination tubes 324 consistent with that within the optical cable, and may be positioned within layers of redundant barriers intended to prevent exposure of the optical fibers to conditions (e.g., harsh environment conditions) that may negatively affect the optical fibers. Pressure within the cable may be, for example, about 14.5 psi (1 Bar).

Figure 2B:
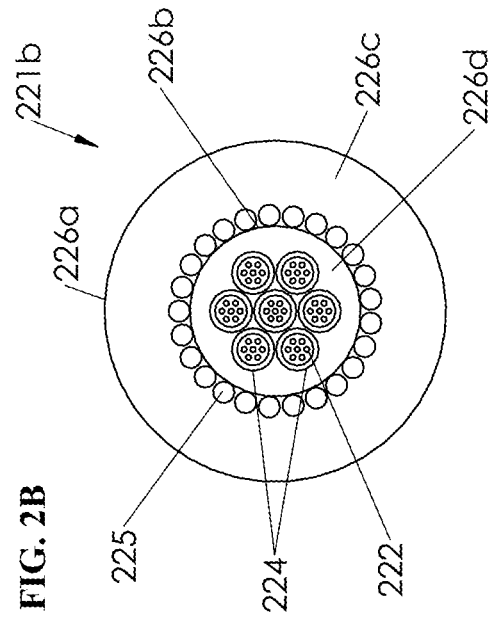

FIGS. 2A and 2B are cross-sectional views of various fiber optic cables 221a,b usable with the fiber optic system 122. Fiber optic cables 221a,b include optical fibers 222, one or more cable tubes 224, and one or more layers 226a-d. The cable tubes 224 are positioned within concentric layers 226a-d. The optical fibers 222 are housed within the cable tubes 224.

As shown in the example of FIG. 2A, the fiber optic cable may be a 'loose tube' fiber optic cable 221a including optical fibers 222 floating in a gel within cable tube 224. The gel may be used to scavenge hydrogen to prevent deterioration of optical fibers and its ability to transmit light (e.g., hydrogen darkening). The optical fibers 222 may be protected within the cable tube 224 in the gel (or other fluid) at a given manufactured pressure (e.g., an atmospheric pressure of about 14.7 pounds per square inch (101.3 kPa).

As shown in the example of FIG. 2B, the fiber optic cable 221b may have multiple cable tubes 224 with optical fibers 222 floating therein. The cable tubes 224 may be helically disposed within the layers 226a-d.

As shown in FIGS. 2A and 2B, the optical cables 221a,b have multiple concentric layers 226a-d disposed around the tube(s) 224. Layer 226d is an insulation layer disposed around the tube(s) 224. Outer layer 226a surrounds the insulation layer 226d. Armored (e.g., steel) wires 225 are provided along an outer surface of the inner layer 226b. An outer insulation layer 226c is positioned between outer layer 226a and inner layer 226b. While a specific configuration of example fiber optic cables 221a,b are shown, various configurations of one or more layers 226a-d and/or other features, such as armored wires, jackets, sheaths, insulation, and/or other features, may be provided to house and protect the optical fibers 222.

While FIGS. 2A and 2B show example versions of a 'loose tube' concentric and co-axial fiber optic cable, other versions may be used, such as a tight buffer cable with a single fiber therein. The cable may have various features, such as one or more optical fibers within one or more tubes, a circular or non-circular cross section, one or more layers about one or more of the tubes, gel and/or other substance to support the optical fibers in the tubes, maintained pressure within the tubes. Examples of various fiber optic cables that may be used are commercially available from GENERAL CABLE™ at www.generalcable.com.

Fiber Optic Termination Assembly

FIGS. 3A and 3B are schematic diagrams depicting the fiber optic system 122 of FIG. 1 in greater detail. As shown in these views, the fiber optic termination 102 includes a fiber optic housing 328, a fiber connection assembly 329, and connector 335. The fiber optic housing 328 has a passage 327 therethrough to receive the fiber optic cable 121 (which may be in the form of cables 221a,b of FIGS. 2A,2B) at one end and connects via connector 335 at an opposite end to equipment (e.g., the sea floor equipment 120).

The fiber optic cable 121 extends into one or more sealed chamber 331 along passage 327 of the housing 328 where it is stripped of its outer layers to expose the cable tube 224. The cable tube 224 is connected to the fiber connection assembly 329 to distribute optical fibers 222 for connection to the sea floor equipment 120. The fiber connection assembly 329 provides a sealed container about the exposed portions of the fiber optic cable 121 (e.g., the cable tubes 224 and/or optical fibers 222). These exposed portions may be protectably sealed within the chamber 331 of the housing 328. The sealed chamber 331 may be filled with the gel (or other fluid) maintained under pressure. The gel may be similar to the gel in the fiber optic cable maintained at a similar pressure or pressure balanced to ambient pressure.

The fiber connection assembly 329 is positioned within the fiber optic housing 328 and is disposed about exposed portions of the fiber optic cable 121 to provide sealing protection thereabout. The fiber connection assembly 329 includes one or more termination tubes 324, a storage base 334, and a manifold 330 for receiving and distributing optical fibers 222. The fiber connection assembly 329 is sealable about the exposed portions of the fiber optic cable 121 to create a redundant sealed layer thereabout. The fiber connection assembly 329 also provides a second container within which the optical fibers 222 may be exposed for connection to wellsite equipment.

The termination tubes 324 are tubular members disposable about exposed portions of the fiber optic cable 121 to seal thereabout. While depicted as being circular tubes with a central passage therethrough, the termination tubes 324 may be of any shape. The termination tubes 324 may receive the exposed cable 121 therethrough and seal (e.g., hermetically or non-hermetically) to the exposed optical cable 121. These termination tubes 324 may receive the cable tube 224 and/or optical fibers 222 therethrough. The termination tubes 324 may be located about the exposed portions of the optical cable 121, for example, between the cable tube 224 and the storage base 334, between the storage base and the manifold 330, and/or between the manifold 330 and the optical contacts 336.

Tube joints 323 may be provided about the fiber optic cable 121, the termination tubes 324 and/or portions of the fiber connection assembly 329 to seal portions thereof. For example, tube joints 323 may adjoin a portion of the fiber optic cable 121 to a termination tube 324 for sealing connection together. The termination tubes 324, tube joints 323, and/or portions of the fiber connection assembly 329 may be attached to or integral therewith.

The termination tubes 324 may be, for example, seamless straight tubes and/or flexible tubes capable of sealing operation in the termination 102. The termination tubes 324 may be provided with flexibility by, for example applying a pattern (e.g., longitudinal geometric pattern) on the tube (e.g., using a metal forming processes). In an example, the termination tubes may be seam welded tubes.

Various lengths of termination tubes 324 may be used and staggered along the length of portions of the fiber optic cable 121. Optical epoxy may be applied for a predetermined length to fill the space between optical fiber 222 and an inner surface of the tube joint 323 to adjoin the termination tubes 324 to the tube joints 323 and/or to portions of the components of the termination 102, such as the manifold 330 and/or storage base 334, and cured thereto. Upon curing, the epoxy may sealingly engage with the optical fibers 222 and jumper the termination tube 324.

The storage base 334 receives a length of the exposed portion of the fiber optic cable 121 from one or more termination tubes 324. The storage base 334 allows for a length of the optical fibers 222 to be enclosed therein so that a necessary length of optical fibers 222 is present to provide the needed length for splicing operations as is described further herein. The exposed portions of the fiber optic cable 121 extend through the storage base 334 and to the manifold 330 via the termination tube(s) 324.

The manifold 330 receives the exposed portions of the fiber optic cable 121 at one end and passes them through distribution paths in the manifold 330. The distribution paths extend through the manifold 330 for distributing one or more cable tubes 224 and/or optical fibers 222 for connection with optical contacts 336 of connector 335. The manifold 330 may have various configurations as described further herein.

The cable tubes 224 and/or optical fibers 222 pass from the distribution paths to the optical contacts 336 via the termination tubes 324.

Connector 335 has optical contacts 336 on an end thereof receivable by a corresponding plug 338 of the sea floor equipment 120. The optical fibers 222 pass through the termination tubes 324 and are coupled to the optical contacts 336 for communication therewith. As shown by FIG. 3B, the termination 102 may be modular for connection and/or disconnection as is described further herein.

The termination may be a modular or unitary device. The components of the termination 102 may be replaceable, for example, for maintenance and/or repair. Additional connectors and/or other portions of the termination 102 may be modularly provided along the termination to vary a length of components of the fiber optic termination 102. Part or all of the components of the termination may be rigid and/or flexible.

FIGS. 4A-4C are perspective, cross-sectional, and exploded views, respectively, of the fiber optic termination 102. FIG. 4B is a cross-sectional view of the fiber optic termination of FIG. 4A taken along line 4B-4B. Some internal portions are in cross-section for descriptive purposes. As shown in this view, the housing 328 defines a passage 327 therethrough and the sealed chambers 331a-c therein for receiving the fiber optic cable 121 therein.

The housing 328 may be provided with one or more layers and/or chambers to seal the optical cable 121 as it is exposed within the housing 328. The housing 328 may be sealed such that the sealed chamber 331 defines a waterproof environment isolated from exposure to external (e.g., harsh) conditions. The chamber(s) may be pressure balanced to maintain pressure (e.g., atmospheric or ambient pressure) therein. The housing 328 may be filled with a fluid to maintain a pressure balance within the housing 328 to support the optical fibers 222 within the optical cable 121. The pressure may be maintained, for example, to prevent pressure to the termination and/or optical cables when the termination 102 is deployed to subsea locations at increased pressure.

The housing 328 may be a unitary or modular container made from materials capable of, for example, withstanding various operations, such as assembly, handling, installation and/or in-service loading (e.g., loading from the harsh environment), corrosion resistance (e.g., to sea water), and/or compatibility with the operating environment and/or other components in physical and/or electrochemical contact with the housing.

The housing 328 may be made of a variety of materials, such as metallic, plastic, alloy, and/or other materials (e.g., stainless steel, nickel, chromium, titanium, polymer, plastic, nylon, PEEK, ABS, PE, PET, PBT, PTFE, PEI, and/or other materials of various grades). Example materials include corrosion resistant metal alloys (e.g., super duplex stainless steel alloys, titanium alloys, nickel and chromium based alloys and/or austenitic stainless steel alloys, cathodic protected metals, etc.) and/or nonmetallic materials (e.g., thermoplastics, engineering plastics, polymers, Nylon, ABS, PE, PET, PBT, PTFE, PEI, PEEK, etc.), and/or rigid composites (e.g., metallic or nonmetallic materials). Coatings, corrosion protection, and/or other materials may be applied or integrated into the housing.

As shown in the example of FIGS. 4A-4C, the housing 328 of the fiber optic termination 102 may include modular portions, such as an entry housing 328a, a tube housing 328b, a manifold housing (or tube) 328c, a flexible housing 328d, and a connector housing 328e. The entry housing 328a includes a tapered portion 430a and a sealed connector 430b.

The tapered portion 430a is coupled to an entry end of the tube housing 328b by the sealed connector 430b and a housing seal 429. A larger end of the tapered portion 430a receives a portion of the sealed connector 430b. The tapered portion 430a and the sealed connector 430b are aligned to receive the cable 121 therethrough. Further details about the entry housing 328a are described further herein with respect to FIG. 6.

The tube housing 328b is positioned between the entry housing 328a and the manifold housing 328c. The tube housing 328b receives a portion of the sealed connector 430b in its entry end. As shown, the sealed connector 430b extends a distance into the one end of the tube housing 328b and an integral manifold 330a extends into an opposite end of the tube housing 328b and defines a sealed chamber 331a therebetween. The integral manifold 330a may be rigidly connected to taps in the tube housing 328b.

The manifold housing 328c is sealingly coupled between the tube housing 328b and the flexible housing 328d. The integral manifold 330a may include a sealed interface (e.g., o-ring seal) for sealing engagement between the tube housing 328b and the manifold housing 328c. The manifold housing 328c has a portion of the integral manifold 330a extending into one end and a portion of the flexible housing 328d extending into an opposite end thereof to define the sealed chamber 331b therein.

The manifold housing 328c may be coupled to the integral manifold 330a and to the tube housing 328b by various connection means, such as press fit, bonding, threading, clamping, crimping, fastener, and/or other means. For example, the manifold housing 328c may be coupled to the tube housing 328b by the integral manifold 330a, which may act as a sealed connector therebetween.

The flexible housing 328d is sealingly coupled at one end to the manifold housing 328c and at an opposite end to the connector housing 328e. The flexible housing 328d may be rigidly connected to taps in the housing 328c and 328e. Housing seals 429 may be provided about ends of the flexible housing 328d for sealing connection with the manifold housing 328c and the connector housing 328e. In this version, the connector housing 328e is integrally connected to the connector 335.

Each housing 328a-e is a hollow tubular or non-tubular member with the passage 327 therethrough shaped to receive the cable 121 and the fiber connection assembly 329 used therewith. An entry end of the tapered portion 430a of the entry housing 328a is shaped to receive the cable 121 therein. The fiber optic cable 121 extends into the sealed connector portion 430b where an outer layer 226a and armored wires 225 (as in FIGS. 2A, 2B) of the cable 121 are stripped away. The inner layer 226b is stripped away in the sealed connector 430b to reveal the inner cable tube(s) 224 with the optical fibers 222 therein.

The cable tube 224 extends from the sealed connector 430b into a first chamber 331a in the tube housing 328b. The termination tubes 324 are connected to the exposed cable tubes 224 by a tube joint 323 and receive the cable tubes 224 and/or the optical fibers 222 therethrough. The optical fibers 222 (with or without the cable tubes 224) within the termination tubes 324 extend through the housing 328. The optical fibers 222 are supported in the manifold housing 328c, flexible housing 328d and to the connector housing 328e by the termination tubes 324.

The termination tubes 324 carrying the cable tube 224 connect to the storage base 334 and the integral manifold 330a to pass the optical fibers 222 therethrough. As shown, the cable tube 224 may extend from the termination tubes 324, through the storage base 334, through another set of termination tubes 324 and into the integral manifold 330a. The cable tube 224 extends through distributor paths of the manifold and into another set of termination tubes 324. A second chamber 331b may be defined in the manifold housing 328c, and flexible housing 328d. The connector housing 328e defines another fluid tight chamber 331c about the fiber optic cable 121.

The termination tubes 324 also extend from the flexible housing 328d and to the optical contacts 336 in the connector housing 328e. The optical fibers 222 are protected within the fiber connection assembly 329 as they pass through the housing 328 to the connector 335 for connection via contacts 336 to the plug 338 of the equipment (e.g., sea floor equipment 120 of FIGS. 3A and 3B).

The optical contacts 336 extend into the connector housing 328e to directly receive the termination tubes 324 containing the cable tubes 224 and the optical fibers 222. The optical fibers 222 may be exposed within the termination tubes 324 of the connector housing for optical coupling within the optical contacts 336. The optical fibers 222 are optically coupled to the equipment via a connection between the optical contacts 336 and the corresponding plug 338 of the equipment (e.g., sea floor equipment 120 (FIGS. 3A, 3B)).

The housing 328 may have one or more sealed chambers 331 defined therein along passage 327 extending through the housing 328. As shown, the housing 328 has the chambers 331a-c defining water tight and pressure secure chambers about the fiber connection assembly 329 with the exposed portions of the cable 121 protectively housed therein. The chambers may be surrounded by one or more layers and/or bladders. As shown, the chamber 331a may have a bladder 435 therein made of a tubular or non-tubular flexible material (e.g., elastomer) that may be stretched in the radial direction as needed. The bladder 435 lines the tube housing 328b between the sealed connector 430b and the integral manifold 330a to define a fluid tight chamber 331a therein. The bladder 435 may be secured in place between the integral manifold 330a, the sealed connector 430b and the tube housing 328b by a retainer ring, plates, and/or other devices. The bladder 435 may have a fluid source to maintain fluid pressure therein as is described further herein.

FIG. 5 shows another cross-sectional view of the fiber optic termination 102 of FIG. 4A taken at a different angle along line 5-5. The fiber optic termination 102 has been modified to define a modified fiber optic termination 102' with a modified connection assembly 329'. As shown in this view, the modified connector housing 328e' may optionally be modular as is described further herein.

As also shown in this view, the bladder 435 in the tube housing 328b is supported by plates 533 and the manifold has the distribution paths 532 therethrough. The fiber storage base 334 may be secured in place in the tube housing 328b by a plastic or metallic bushing and/or by a fastener connected to the structural plates 533.

While a specific configuration is provided, various combinations of one or more housings, connectors, seals, and/or other features may be provided to protect the fiber optic cable 121, the fiber optic system 122, and/or its components. The housing(s) 328 may include rigid and/or flexible portions as needed to facilitate assembly, removal, maintenance, operation, and/or other needs. The housing 328 may also be provided with other features, such as taps therethrough to receive fasteners, and/or holes to provide passage for the free flooding of ambient fluid (e.g., sea water) to flow around the external surface of the bladder 435. Fluid may be flooded in the housing 328, for example, to provide pressure balancing of the chamber 331a.

Entry Housing

Figure 6:
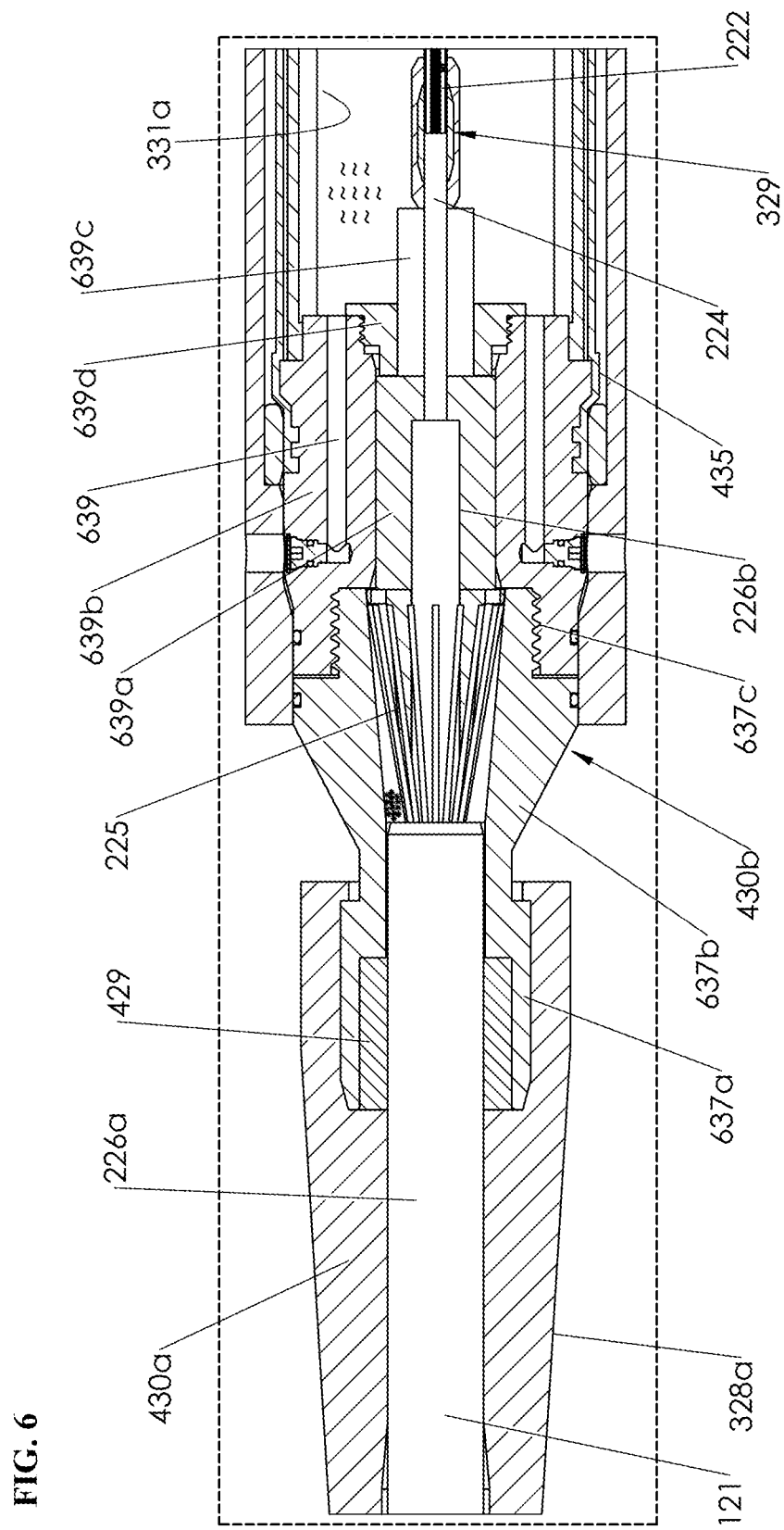
FIG. 6 is a cross-sectional view of an entry portion of the fiber optic termination of FIG. 5.

FIG. 6 shows an entry portion 6 of the fiber optic termination of FIG. 5 in greater detail. The fiber optic cable 121 is sealingly engageable with the tapered portion 430a upon entry therein. The material of the entry housing 328a may be sealingly engageable with an outer surface of the fiber optic cable 121. For example, the entry housing 328a may be made from an elastomeric material (e.g., rubber, thermoplastic, thermoplastic elastomer, etc.) sealingly engageable with the outer layer of the cable 121. The diameter and length of the entry housing 328a may be defined to facilitate sealing therebetween.

Sealing about the fiber optic cable 121 may also be provided by various portions of the housing 328 and/or seals (e.g., seal 429 of FIG. 4B, 5). The entry housing 328a may be configured to provide an entry seal against the ambient pressure of the environment. The fiber optic cable, housing, seals, fiber connection assembly, and/or portions thereof may be made of materials that provide sealing engagement therebetween. In at least some cases, such features may stretch and/or respond to pressure (e.g., deform) to facilitate sealing engagement therebetween.

The housing may also be provided with seals (e.g., seal 429 of FIG. 4B, 5) for sealing with the cable 121. The seal 429 may be, for example, a ring-shaped backup seal having a cylindrical body receivable within the connector portion 430b of the entry housing in an annular space between an outer surface of the fiber optic cable 121 and the entry housing 328a.

As shown in this view, sealed connector 430b has a tip 637a, a tapered shaft 637b, and an end 637c with a passage to receive the optical cable 121 therethrough. The tip 637a is receivable into the tapered portion 430a of the entry housing 328a. A seal ring (e.g., housing seal 429) may optionally be provided in the tip 637a to sealingly engage the optical cable 121. Seals may be provided about the outer sleeve 639b for sealing engagement therebetween.

The tapered portion 637b extends between the entry housing 328a and the tube housing 328b, and is receivable in the end 637c (e.g., by threading). The end 637c has an inner sleeve 639a, an outer sleeve 639b, and an extension sleeve 639c. The outer sleeve 639b is receivable along the inner surface of the tube housing 328b. The inner sleeve 639a is receivably supported within the outer sleeve 639b, and has a passage to receive portions of the cable tube 224 therein. The extension sleeve 639c extends from an end of the inner sleeve 639a within an end of the outer sleeve 639b. A retaining nut 639d may optionally be connected about the sleeves 639a-c to secure the sleeves in position.

As shown, the sealed connector 430b may have one or more portions shaped to receive portions of the optical cable 121 as they are stripped to expose the tube 224 containing the optical fibers 222. The inner sleeve 639a may sealingly engage the inner layer 226b and the tube 224 as they are exposed from the cable 121. The inner sleeve 639a may have a shape to receive the cable 121 and have a step to receive the outer diameters of portions thereof.

The outer layer 226a of the cable 121 may be stripped such that the armored wires 225 are exposed within the sealed connector 430b. The armored wires 225 are spread to provide mechanical support to the cable 121. The armored wires 225 are disposed about a tapered portion of the inner sleeve 639a to axially retain the cable 121 in place against longitudinal pulling away. A retention material (e.g., a matrix formed from a potting compound, such as a two part wire rope termination chemical) may optionally be placed about the armored wires to secure them in place between the sleeve 639a and the sealed connector 430b.

The exposed cable tube 224 extends from the inner sleeve 639a and through the extension sleeve 639c and the retaining nut 639d. The exposed cable tube 224 extends into the fiber connection assembly 329 as it passes through the remainder of the termination (not shown in this figure). Optical fibers 222 are protectively maintained within the cable tube 224 and/or the fiber connection assembly 329. The optical fibers 222 may optionally pass through the fiber connection assembly 329 with or without the cable tube 224 thereabout.

As also shown in this view, the bladder 435 may be filled by a fluid. The outer sleeve 639b has a fluid conduit 639 therethrough alignable with a port through the tube housing 328b. Fluid (e.g., oil, glycol, de-ionized water, grease, gel, and/or other compatible fluid) may be provided in chamber 331a. The passage 639 may be used to fill the chamber 331a (and other chambers) with fluid.

A valve is optionally provided therein to selectively allow fluid exchange between the chamber 331a and an exterior of the housing 328. The fluid filled chamber 331a may be sealed from ambient pressure by a plug that is in sealing engagement with chamber 331a. The plug may have an o-ring seal and be retained in place by a retaining ring. When the ambient pressure of the environment is experienced by the bladder 435, the bladder may flex under the ambient pressure until pressure in the bladder 435 is equalized with the pressure outside of the housing 328.

Fiber Connection Assembly

FIG. 7 is a perspective view of an example configuration of the fiber connection assembly 329. The fiber connection assembly 329 is depicted as being removed from the housing 328 to show its components in greater detail. As shown by this view, the fiber connection assembly 329 may have various configurations for protectively housing the exposed portions of the cable 121 as it passes through the termination 102. As shown by these views, the fiber connection assembly 329 includes various components sealingly enclosed about the exposed cable 121 to provide a second layer of protection about the cable tubes 224 and optical fibers 222 within the housing 328.

The fiber connection assembly 329 as is shown in FIG. 7 includes the storage base 334, the integral manifold 330a, and the termination tubes 324 for receiving optical fibers from the exposed optical cable 121. The optical fibers 222 are protectively maintained within the termination tubes 324 in their natural environment surrounded by gel. The termination tubes 324 may be connected to the storage base 334, the integral manifold 330a, and/or other tubular connections by mechanical bundling aids, such as equally spaced tray and tape.

The outer layer 226a of the optical cable 121 is stripped back to expose the armored wires 225 and inner layer 226b. The inner layer 226b is stripped back to expose the cable tube 224. The termination tube(s) 324 are sealingly connected to the cable tube 224 to receive the cable tube 224 and/or optical fibers 222 therethrough.

The optical fibers 222 are passed from the optical cable 121 into the storage base 334 and the integral manifold 330a via the termination tubes 324. The termination tubes 324 extend from cable tube 224 to the storage base 334, from the storage base 334 to the integral manifold 330a, and from the integral manifold 330a to the connector 335 (not shown). The termination tubes 324 may be integrally formed with or connectable to the storage base 334, integral manifold 330a, the connector 335, and/or other components of the termination 102.

As also shown in this view, the cable tube 224 extends from the inner layer 226b, through the storage base 334 and into the integral manifold 330a. The cable tubes 224 and/or optical fibers 222 are dispersed through the integral manifold 330a and out a plurality of outlets 748 of the integral manifold 330a. The cable tubes 224 and/or optical fibers 222 pass through the termination tubes 324 to certain optical contacts of connector 335 for optical connection therewith.

The tube joints 323 are also provided to connect the termination tubes 324 to cable tubes 224, other termination tubes 324, and/or other components (e.g., storage base 334, integral manifold 330a, etc.). The tube joints 323 may be discrete tubular seals that receivably seal about the various portions of the fiber optic cable 121 and the fiber connection assembly 329 to provide a seal thereabout.

The termination tubes 324 and tube joints 323 may be made of various materials, such as elastomers and/or plastics sealable with the various portions of the fiber optic cable 121 and/or various portions of the fiber connection assembly 329. The termination tubes 324 may be identical to the cable tubes 224 (FIGS. 2A and 2B).

Storage Base

FIG. 8 shows the fiber storage base 334 in greater detail. A cover of the storage base 334 has been removed to reveal a chamber 843 therein. The storage base 334 is positionable in the housing 328 for hosting a length of the optical fibers 222 therein.

The fiber storage base 334 may have a circular, rigid body 842 to protect the optical fibers therein. The body 842 (and/or cover) may have a shaft portion and a shoulder collar with at least one groove along an outer surface thereof to accommodate a seal. Tubular arms 840 may extend radially from opposite sides of the body 842. The optical fibers 222 may extend through the tubes 324 and the tubular arms 840 into the chamber 843 defined within the circular body 842.

As needed, a length of the optical fibers 222 may be provided for operation with the fiber optic system described herein. The optical fibers 222 may be spliced together using, for example, optical fusion splicing. The spliced optical fibers 222 stored inside the fiber storage base 334 may be surrounded by gel. The optical fibers 222 may be coiled and held inside the chamber prior to use. Gel may be added to fill up the space beyond the cable tube 224 that contained the same gel and/or to maintain the optical fibers at pressure. The cover (shown in FIGS. 4B, 5, and 7) is positionable over the circular body 842 to sealably contain the optical fibers 222 therein.

The tubular arms 840 may be rigid or flexible tubular supports to receivingly support the optical fibers 222 therein. The tubular arms 840 may abuttingly engage the cable tube 224 and/or termination tube 324 to maintain a seal about the optical fibers 222 extending therethrough. This abutting engagement may be provided on one or both sides of the fiber storage base 334. Tube joints 323 may also be provided.

The storage base 334 and/or tubular arms 840 may be made from various materials, such as stainless steel alloys, copper alloys, and thermoplastic (e.g., PEI or PEEK). The tubular arms 840 may also be made out of elastomeric tubing, such as surgical tubing. The tubular arms 840 may be integrally formed with the body 842, or secured thereto by laser beam welding, welding, ultrasonic welding, electron beam welding, brazing, soldering, and/or other connection method and/or means. Portions of the fiber storage base 334 may be joined, for example, using laser beam welding, welding, ultrasonic welding, electron beam welding, brazing or soldering. In another example, an elastomeric suction cup seal may be stretched over the fiber storage base 334 to enclose it therein.

The fiber storage base 334 may be provided with additional features. Optionally, a spool may be provided in the storage base 334 for coiling the optical fibers 222 therein. Hermetic and/or non-hermetic seals may be provided about a periphery of the body, between the cover and the body, and/or between the arms and the tubular connections. "Hermetic" as used herein refers a seal that is fluid (or air) tight. To prevent passage of the fluids past the seal.

While the storage base 334 is shown in the housing 328b, it will be appreciated that one or more storages bases 334 may be positioned in various locations about the termination 102, such as in the manifold housing 328c.

Manifold(S)

FIGS. 9-12B show various configurations of manifolds usable with the fiber optic terminations of FIGS. 4A-5. FIG. 9 is a detailed view of the integral manifold 330a of FIG. 7 in a sealed configuration. FIG. 10A is a cross-sectional view of a portion 10A of the termination 102 of FIG. 5 depicting the integral manifold 330a. FIG. 10B is a cross-sectional view of a modified version of the integral manifold 330a'. The integral manifold 330a is used to route the optical fibers 222 from the fiber optic cable 121 to optical contacts 336 of the connector 335 (see, e.g., FIG. 4B).

The integral manifold 330a includes a manifold base 942, a manifold cover 944, and a distributor 946. The manifold base 942 is a ring-shaped member with the manifold cover 944 on one end and the distributor 946 supported therein.

An outer surface of the integral manifold 330a may be provided with threading or other connection means to sealingly secure the integral manifold 330a in position. The manifold base 942 may have an outer surface connectable to the tube housing 328b and the manifold housing 328c. An outer surface of the manifold cover 944 may have a profile for sealing engagement with bladder 435. This outer surface may be stepped for interface with portions of the tube housing 328b. The outer surface of the manifold cover 944 may be connected between the tube housing 328b and the manifold housing 328c. As shown in FIGS. 4B and 5, seals 429 may also be provided.

The manifold cover 944 may sealingly engage the termination tube 324 at the inlet end to receive the optical fibers 222 therefrom. The manifold cover 944 is a funnel-shaped member with an inlet 948a tapered to sealingly engage the termination tube 324 and receive the optical fibers 222 therethrough. The cover 944 abuttingly engages the manifold base 942. A base end of the manifold cover 944 is connectable to the manifold base 942 by various connection means.

The integral manifold 330a may be filleted to provide a transition for protecting the routed optical fibers 222 (e.g., from detrimental abrasion and stress concentration). This transition may be provided between the manifold cover 944 and the distributor 946. The distributor 946 is a solid member receivable in the manifold cover 944 and supported by the manifold base 942. The distributor 946 defines the path 532 for distributing the optical fibers 222 through the integral manifold 330a. The path 532 is a tubular channel defined between an internal surface of the manifold cover 944 and an outer surface of the distributor 946.

The path 532 may extend from the inlet 948a to outlets 948b at an outlet end of the integral manifold 330a. The path 532 may be arranged (e.g., at a predefined pitch circle diameter) for space distribution of the optical fibers 222 through the termination 102. The paths 532 may be stepped with various diameters as useful to convey the cable tubes 224 and/or optical fibers 222 therethrough.

The distributor 946 has a plurality of outlets 948b extending axially from an outlet end thereof, and shaped to pass a portion of the optical fiber 222 therethrough. The outlets 948b are connectable to termination tubes 324 that extend from the integral manifold 330a for connection to the connector 335. The fiber outlets 948b may be spaced about the distributor 946 for connection with the optical contacts 336 (FIG. 4A). The fiber outlets 948b may be positioned in alignment with the optical contacts 336 with the optical fibers 222 extending linearly therebetween.

The termination tubes 324 may be hermetically joined to the inlet 948a and/or outlets 948b of the integral manifold 330a. The termination tubes 324 may be coupled to, or integrally formed with, the integral manifold 330a. The optical fibers 222 may be distributed out the outlets 948b and into the termination tubes 324 under the protection of the tube joints 323.

Figures 10A, 10B:
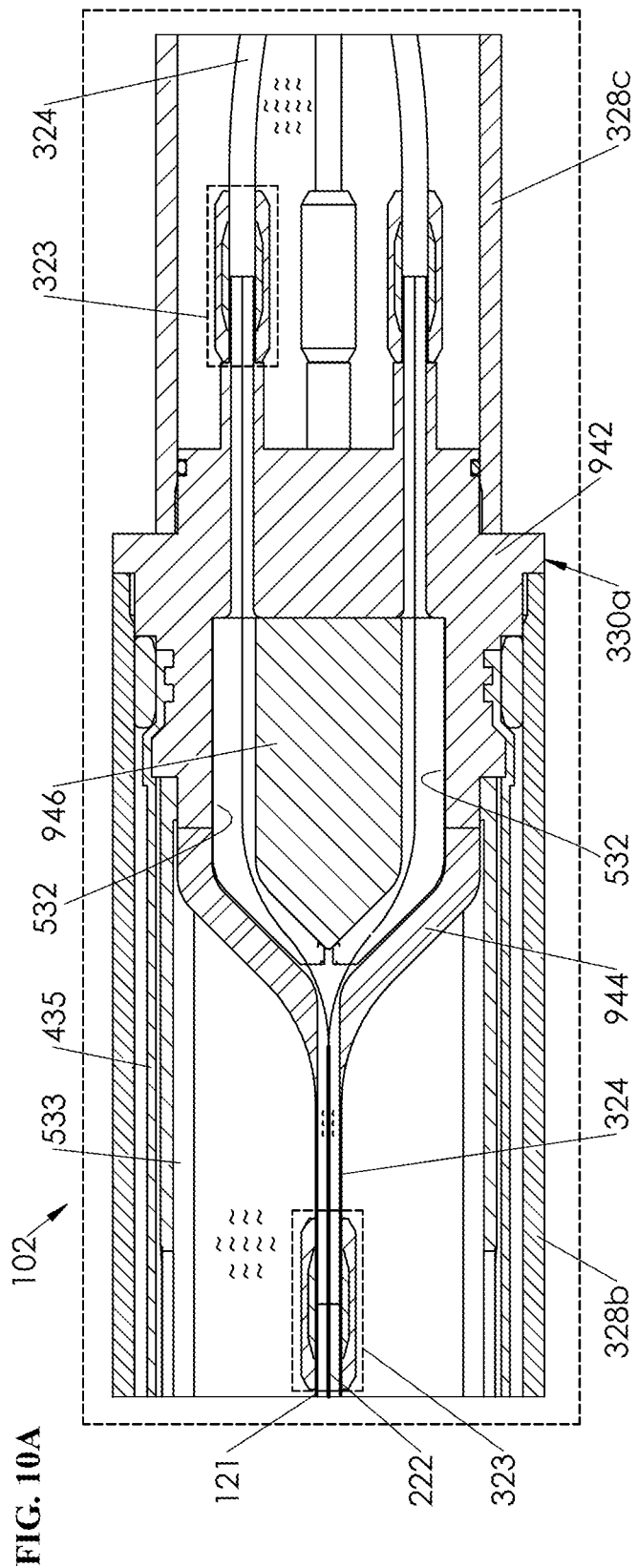
FIGS. 10A and 10B are longitudinal, cross-sectional view of the manifold portion of the fiber optic termination of FIG. 5 depicting example configurations of the integral manifold.

The integral manifold 330a may be provided with various features and/or variations. The manifold cover 944 may be integrally formed or sealed to the manifold base 942. As shown in FIG. 10A, the manifold cover 944 may have an end positioned adjacent to the manifold base 942 in abutting engagement therewith. As shown by the modified version of the integral manifold 330a' of FIG. 10B, a portion of the modified cover 944' may optionally be received into the modified manifold base 942' with a seal therebetween. The modified manifold cover 944' may have a stepped end receivable into an adjacent end of the modified manifold base 942'. The modified manifold cover 944' and the modified manifold base 942' may be provided with matable ends for mating connection therebetween. A seal may be provided therebetween for sealing engagement between the manifold base 942' and cover 944'. The modified manifold 330' may have a modified distributor 946' therein.

The integral manifold 330a, a' may be formed from a single component from manufacturing process, such as casting, or formed of separate components joined together permanently or temporarily (e.g., by bonding or fasteners). The integral manifold 330a, a' may provide a hermetic or non-hermetic seal about the optical fibers. Additional seals (e.g., o-rings) may be provided. The integral manifold 330a, a' may be dimensioned with a desired thickness and shape for operation in the termination 102.

Figure 11A:
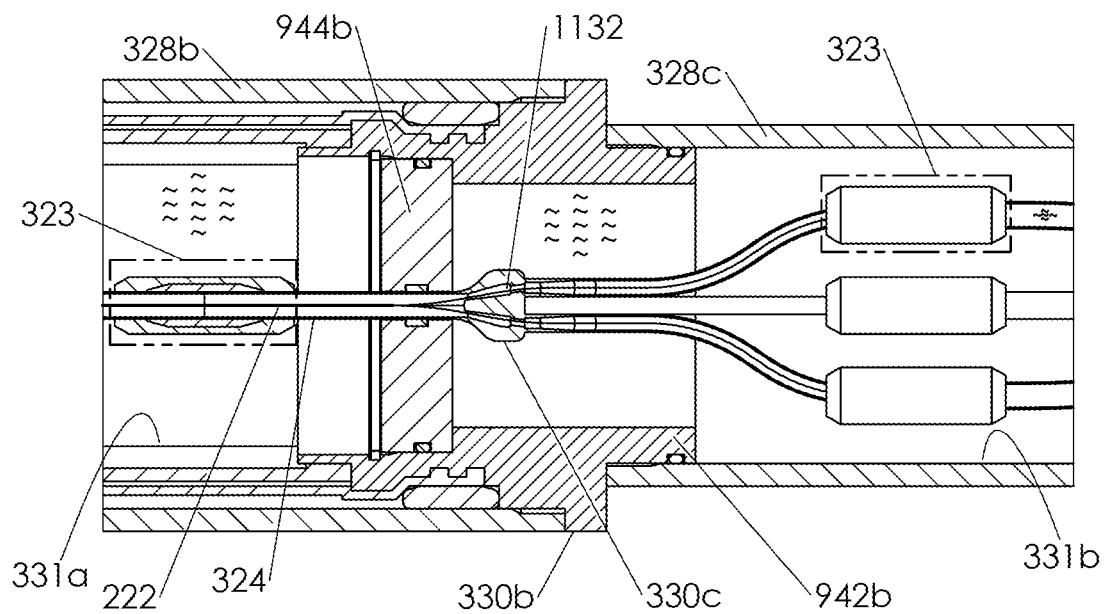
FIGS. 11A and 11B are longitudinal, cross-sectional views of manifold portions of the fiber optic termination depicting additional example configurations of integral manifold integral manifold.
Figure 11B:
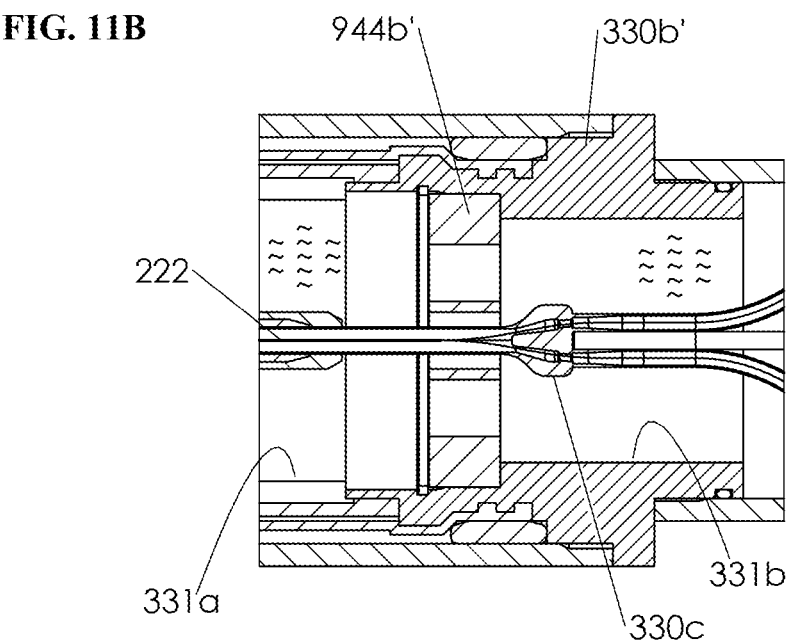

FIGS. 11A-11B show additional versions of a plate manifold 330b, 330b' with a separate manifold 330c in a radially compliant configuration. In this version, the plate manifold 330b includes a modified manifold base 942b and manifold cover 944b. In place of the distributor 946, the separate manifold 330c is coupled to the manifold cover 944b adjacent the hole to receive and distribute the optical fibers 222 therethrough.

The manifold cover 944b is a circular plate receivable in an end of the manifold base 942b. The plate cover 944b has a hole to receivingly engage the termination tube 324 through this hole. The termination tube 324 may be in sealing engagement with the manifold cover 944b by a seal. The manifold base 942b also has an opening therethrough. The manifold cover 944b closes an inlet end of the manifold base 942b. The external surface of the manifold base 942b is positionable in sealing engagement with the tube housing 328b and the manifold housing 328c.

The separate manifold 330c is receivable in an outlet end of the manifold base 942b. Termination tubes 324 extending through the plate cover 944b are coupled directly to the separate manifold 330c to pass the optical fibers 222 therethrough. The separate manifold 330c has paths 1132 to distribute the optical fibers 222 therethrough. The termination tube 324 extends through the manifold cover 944b and is coupled to the separate manifold 330c. The optical fibers 222 are dispersed through the separate manifold 330c. Tube joints 323 may be provided along the termination tubes 324 to connect sections of the termination tubes 324 and/or optical fibers 222 passing therethrough.

As shown by FIG. 11B, a modified manifold cover 944b' may be provided. In the example shown, the manifold cover 944b' has multiple concentric holes therethrough, with the separate manifold 330c threaded through the manifold cover 944b'. As shown, one or more holes may be provided in the manifold cover 944b' to define a conduit for fluid exchange between the housing chamber 331a and the manifold chamber 331b. In this version, the fluid filled in the respective chambers 331a,b is the same.

Figure 12A:
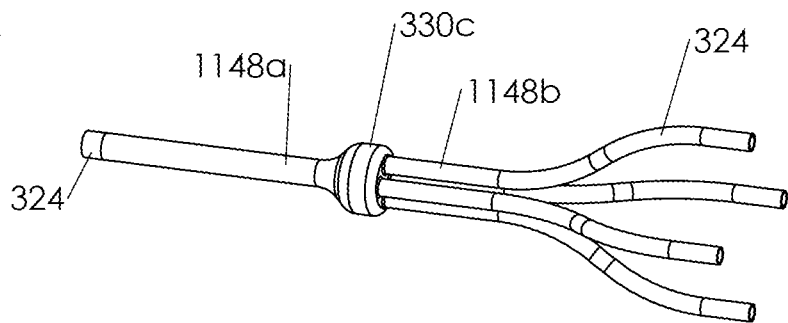
FIGS. 12A and 12B are perspective and longitudinal, cross-sectional views, respectively, of the integral manifold.
Figure 12B:
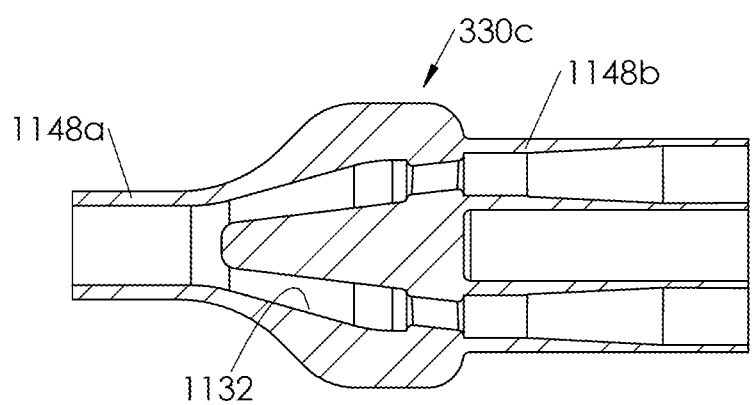

FIGS. 12A and 12B shows additional views of the separate manifold 330c. As shown in these views, the separate manifold 330c has inlet tubes 1148a at an inlet end to receive the termination tubes 324 and outlet tubes 1148b to pass the optical fibers 222 therethrough with the path 1132 therebetween. The outlet tubes 1148b extend from the body of the separate manifold 330c to define extended passages to pass the optical fibers 222 therethrough. The outlet tubes 1148b may be in the form of tubular chambers with webbing therebetween extending axially from the body. The inlet and outlet tubes 1148a,b in this version are integral with the body of the separate manifold 330c, but optionally may be coupled thereto. Termination tubes 324 may be coupled to the outlet tubes 1148b and sealed therewith to pass the optical fibers 222 therethrough.

Figure 13A:
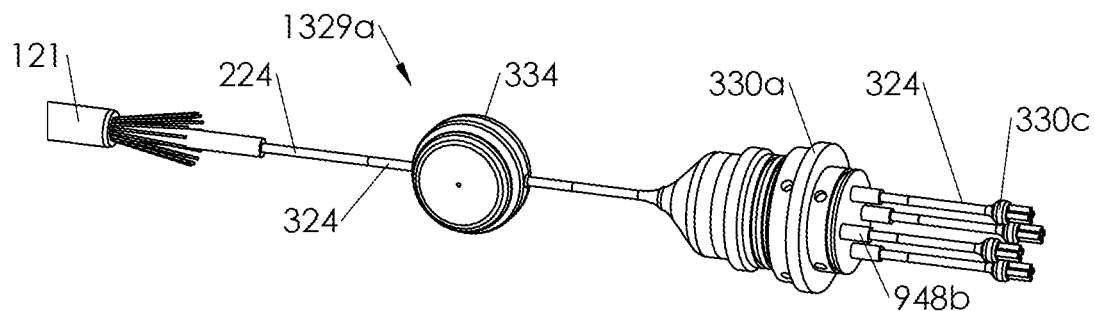
FIGS. 13A and 13B are perspective views of additional configurations of the fiber connection assembly with integral manifolds.
Figure 13B:
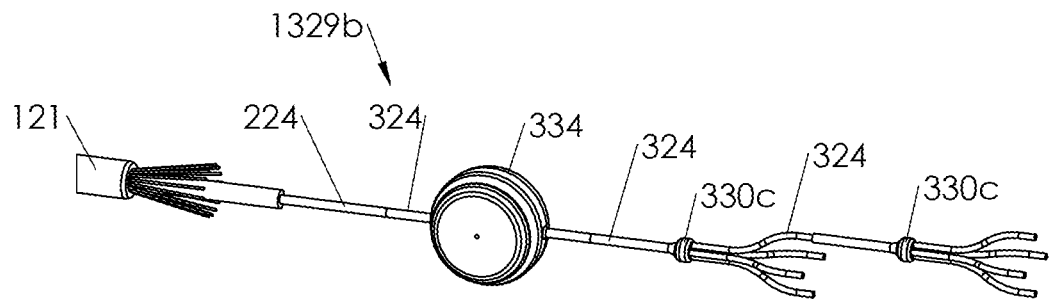
Figure 14A:
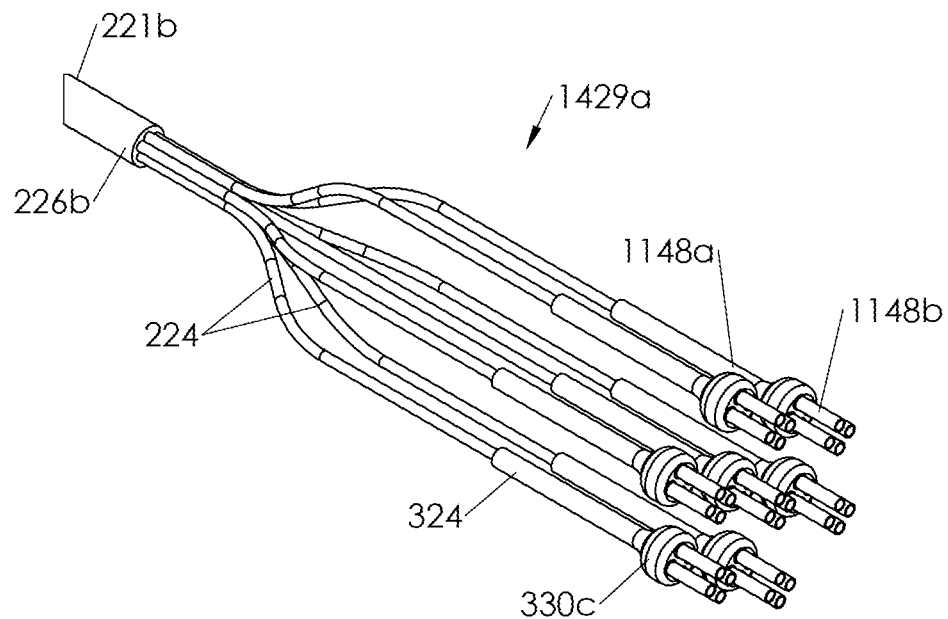
FIGS. 14A-14B are perspective views of more additional configurations of the fiber optic connection assembly including extended and cube manifolds, respectively.
Figure 14B:
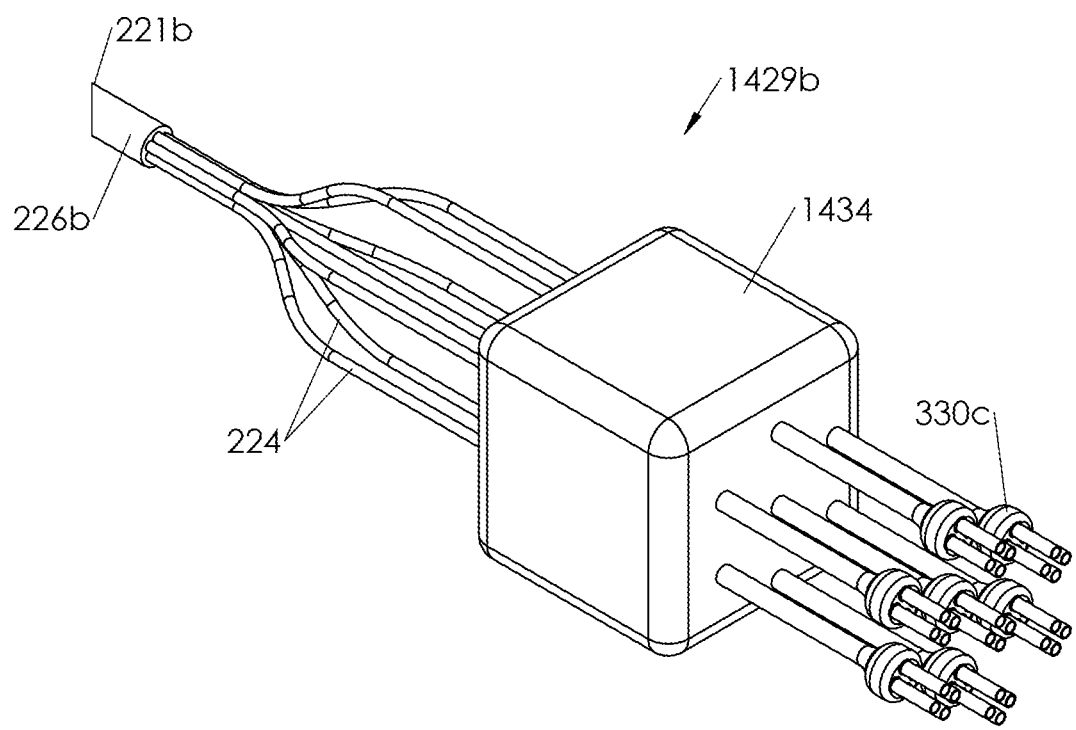

FIGS. 13A-14B show additional configurations of multi-layer fiber optic assemblies 1329a,b and 1429a,b, respectively. The fiber optic assemblies 1329a,b of FIGS. 13A-13B are used with the storage base 334. The fiber optic assemblies 1429a,b of FIGS. 14A-14B are used without the storage base 334.

The fiber optic assembly 1329a of FIG. 13A is similar to the fiber optic assembly 329 of FIG. 7, except that each termination tube 324 exiting the integral manifold 330a is received by the separate manifold 330c to distribute optical fibers 222 therethrough. This provides for distribution of a portion of the optical fibers 222 through the integral manifold 330, and a second distribution of each of these portions of optical fibers 222 into subsets via the separate manifolds 330c. As shown, the separate manifolds 330c are the same distance from the integral manifold 330a to provide a parallel arrangement of secondary distribution.

The separate manifold 330c may be used in series to cascade and distribute the optical fibers 222 of the fiber optic cable 121. The cable tube 224 may be terminated to the fiber storage base 334, and then to the integral manifold 330a. As shown in FIG. 13A, the termination tubes 324 of the integral manifold 330a may be terminated to the separate manifold 330c in series to the integral manifold 330a and in parallel to each other. The manifold 330a includes four outlets 948b integrally formed at the outlet end thereof. Accordingly, the integral manifold 330a is terminated to separate manifolds 330c that are in series with the integral manifold 330a, while separate manifolds 330c are in parallel to each other.

The fiber optic assembly of FIG. 1329b of FIG. 13B is similar to the fiber optic assembly 329 of FIG. 11A, except that one of the termination tubes 324 exiting the separate manifold 330c passes into a second separate manifold 330c to distribute optical fibers 222 therethrough. As shown in FIG. 13B, the termination tubes 324 may be connected in series by the separate manifolds 330c. These separate manifolds 330c are connected to an end of the previous separate manifold 330c.

Termination tubes 324 may join the respective manifolds 330a-c. As in FIG. 13A, this second separate manifold 330c provides a further distribution of the optical fibers 222 from the termination tube 324. In this version, the separate manifolds 330c are in series along the fiber connection assembly 1329b. These separate manifolds 330c may be terminated at integral manifolds 330a and/or connect to the connector 334.

FIGS. 14A-14B show example versions of a fiber connection assemblies 1429a,b usable with the multi-tube fiber optic cable 221b of FIG. 2B. In the fiber optic assemblies 1429a,b of FIGS. 14A-14B, the termination tubes 324 pass directly into separate manifolds 330c from the optical cable 221b without passing through a storage base. In FIG. 14A, upon exposure of the inner layer 226b of the fiber optic cable 221b, each cable tube 224 is covered with termination tubes 324 separated for entry into individual separate manifolds 330c. As in FIG. 13A, the separate manifolds are parallel and further distribute the optical fibers 222. As also shown by this example, the separate manifolds 330c are provided with inlet and outlet tubes 1148a,b.

As shown in FIG. 14A, the separate manifolds 330c may be in a parallel configuration in direct connection to multiple cable tubes 224 of the fiber optic cable 221b. Each of the cable tubes 224 extend from the fiber optic cable 221b and are terminated to separate manifolds 330c. Termination tubes 324 separate from and/or integral with the separate manifolds 330c may be provided. In this example, the optical fibers 222 are routed from the fiber optic cable 221b via the separate manifolds 330c and directly terminated to the optical contacts 336 of the connector 335 (see, e.g., FIG. 4A, 5).

In the version of FIG. 14B, a dedicated fiber storage 1434 may be used to distribute cable tubes 224 of a fiber optic cable 221b. The cable tubes 224 pass through termination tubes 324 and the fiber storage 1434. As shown in FIG. 14B, a dedicated fiber storage 1434 may be utilized to receive the cable tubes 224 of the cable 221b. In this example, the optical fibers 222 from the cable tubes 224 may be spliced to optical fibers connectable to the optical contacts 336 and maintained inside the dedicated fiber storage 1434 in a gel. As in FIGS. 13A and 14A, the separate manifolds 330c receive the cable tubes 224 and distribute the optical fibers 222 therethrough.

Flexible Hose

Figure 15:
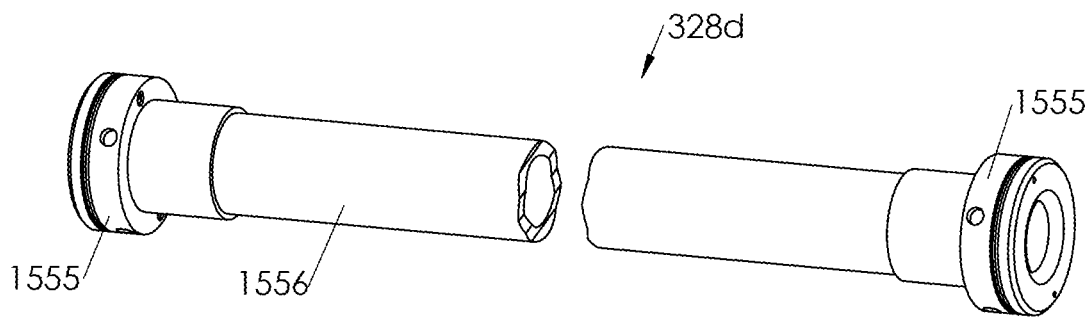
FIG. 15 is a perspective view of a flexible hose.

FIG. 15 is a detailed view of the flexible housing 328d. The flexible housing 328d may be a tubular member, such as a flexible hose, for flexibly connecting the manifold housing 328c and connector housing 328e. Each end of the flexible housing 328d may include a flex connector 1555 receivable in the manifold and connector housings 328c,e. The flex connector 1555 may include a fitting, crimp sleeve, seals and/or other features to sealingly engage the adjacent housings.

A flexible hose 1556 extends between the flex connectors 1555 to sealingly housing the tube 224 containing the optical fibers 222. The flexible hose may have a chamber therein filled with fluid to protectively support the termination tubes 324 with the optical fibers 222 therein. The flexible hose 1556 may fluidly connect chamber 331b of the manifold housing 328c and 331c of the connector housing 328e to pass fluid therebetween (see, e.g., FIG. 4B).

The flexible housing 328d is an optional feature that may be of any length and/or rigidity to support the tube 224 and facilitate connection thereof. The flexible housing 328d may elastically deform under pressure in a radial direction. Pressure may be imparted to fluid within the flexible housing to balance pressure load across the flexible housing.

The flexible housing 328d may be made of a variety of flexible and/or rigid materials of one or more layers defining a passage to receive the tube 224 therethrough. The materials and/or layer(s) of the flexible housing 328e may be defined to provide desired strength and/or abrasion resistance while being compliant to pressure and/or similar loading. The construction may be a homogenous single material (e.g., rubber, metallic, non-metallic, composite, etc.) or composite arrangement. Layers of materials, such as rubber, thermoplastic wire, corrosion resistant metallic spring wire, Kevlar, thermoplastic, etc., may be used.

Connector

Figure 16A:
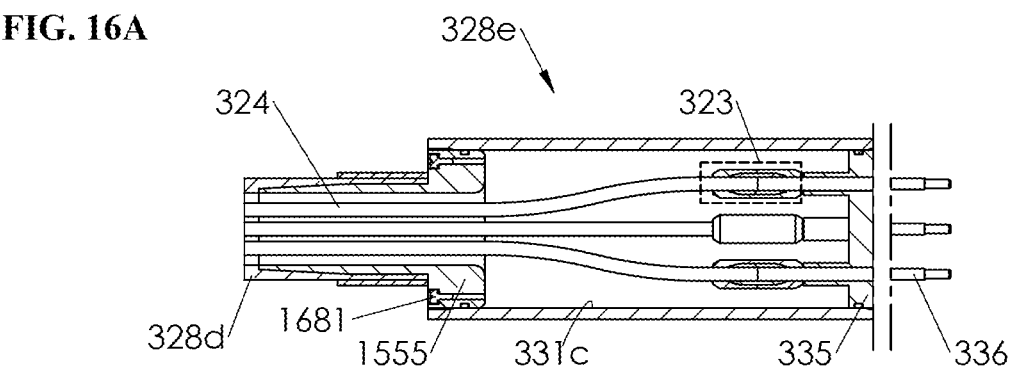
FIGS. 16A and 16B are longitudinal, cross-sectional views of a connector portion of the fiber optic terminations of FIGS. 4B and 5, respectively.
Figure 16B:
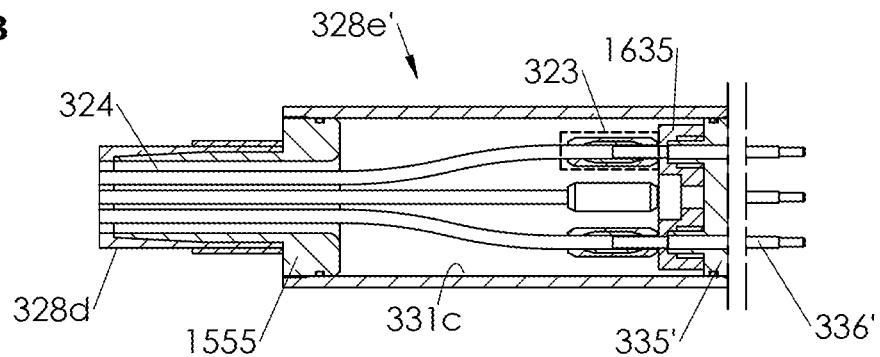

FIGS. 16A and 16B show detailed views of the connector housings 328e, 328e' as shown in FIGS. 4B and 5, respectively. As shown in FIG. 16A, the connector housing receives the flexible housing 328d at one end and has the connector 335 at an opposite end thereof. The connector housing 328e defines the connector chamber 331c therein to receive and support the termination tubes 324 with the optical fibers 222 therein. The termination tubes 324 may pass through openings in the connector housing 328e to enter the chamber 331c.

The connector housing 328e may be in fluid communication with the flexible housing to exchange fluid (e.g., gel) therebetween. Passage conduits 1639 may also be provided to fill the connector chamber 331c with the gel. A plug 1681 may be provided to selectively provide access to the passage conduits. The fluid may be provided in the chamber 331c to maintain pressure therein.

In the version of FIG. 16A, the connector 335 is shaped for receipt by subsurface equipment and provided with the contacts 336 thereon. The optical fibers 222 within termination tubes 324 may be removably connected to the contacts 336. The connector 335 may be a plate-like (or disc shaped) member with inlets connectable to termination tubes 324 to receive the optical fibers in the termination tubes 324 for connection to the optical contacts 336. The optical contacts 336 extend through openings in the connector 335 to engage the termination tubes 324 and connect to the optical fibers 222. Tube joints 323 may optionally be provided about the connection between the termination tubes 324 and the optical contacts 336 as shown.

The connector 335 has holes to receivably support the optical contacts 336 therein. The optical contacts 336 extend through the connector 335 to sealingly engage the termination tubes 324 and to receive the optical fibers 222 therein at one end, and to connectively engage the subsea equipment (e.g., sea floor equipment 120 of FIG. 1) at an opposite end.

In the version of FIG. 16B, the connector 335' may be a conventional connector with optical contacts therein. To enable the connector 335' to receive the termination tubes 324 and connect with the optical fibers 222 therein, a contact adapter 1635 supported on an internal end of the connector 335' with the optical contacts 336' therethrough. The contact adapter 1635 has inlet tubes to receivingly engage the termination tubes 324 and receive the optical fibers 222 therethrough for splicing with the optical contact 336'. Tube joints 323 may optionally be provided about the connection between the termination tubes 324 and the inlet tubes of the contact adapter 1635 as shown.

Figure 17:
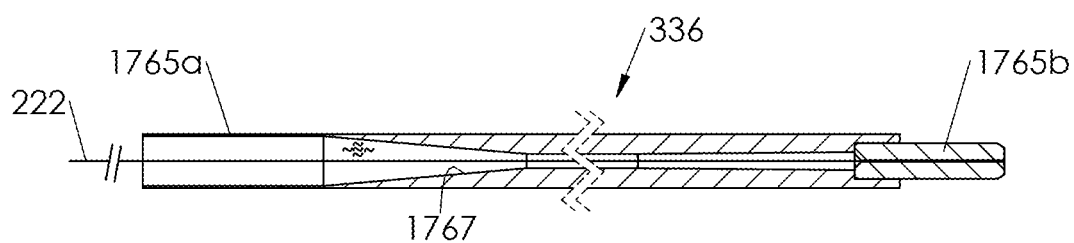
FIG. 17 is a longitudinal, cross-sectional view of a fiber optic contact.

FIG. 17 is a detailed view of the optical contact 336. As shown in this view, the optical contact 336 is a linear member with a receiving portion 1765a and a contact portion (or optical ferrule) 1765b. As shown, the contact portion 1765b may be a separate member receivable in the receiving portion 1765a. The optical contact 336 may have various configurations with one or more integral or modular portions.

The receiving portion 1765a may be a slender body having a tapered inner bore 1767 to receivingly engage the termination tube 324. The optical fiber 222 may be stripped and cleaned of its outer jacket, and inserted in to the receiving portion 1765a. The optical fibers 222 extend into a passage in the receiving portion 1765a and into the contact portion 1765b. Epoxy may be used to bond to the optical fiber 222, fill in the receiving portion 1765a and to the contact portion 1765b thereby forming a pressure seal engagement between them.

In the example shown, the receiving portion 1765a has an inlet to receive the termination tube 324 having the optical fiber 222 therein. The receiving portion 1765a may sealingly engage an end of the termination tube 324 and receive optical fibers 222 extending therefrom. The portions 1765a, b, termination tube 324, and/or optical fibers 222 may be bonded, pressure fit, welded, and/or adhered together by various means. The receiving portion 1765a may be made of a similar construction as the termination tube 324.

The contact portion 1765b is receivable into a contact end of the receiving portion 1765a and is operatively connectable to the optical fiber 222 extending therefrom. The contact portion 1765b may be receivable in an outlet end of the receiving portion 1765a. The contact portion 1765b may be affixed therein by bonding or other means (e.g., epoxy). The contact portion 1765b may be a commercial fiber optic component commonly used in the field of fiber optics and associated art to receive, align and terminate the optical fibers for making connection to a matching ferrule containing optical fiber 222. Examples of optical ferrules usable as the contact portion 1765b are commercially available from THORLABS™ at www.thorlabs.com.

The contact portion 1765b is receivable in a corresponding receptacle (plug) 338 of the sea floor equipment 120 to provide communication between the optical fibers 222 and the sea floor equipment 120 (see, e.g., FIGS. 3A,3B). The optical fibers 222 pig tail from the optical contacts 336 and respectively terminate to the instrument board per the optical signal communication system architecture.

Tube Joints

FIGS. 18A-19F provide various cross-sectional views of example hermetic tube joints 1823 and non-hermetic tube joints 1923 usable as the tube joint(s) 323 herein. The tube joints 1823,1923 may be used for forming sealed connections between portions of the cable and the fiber connection assembly, such as the cable tubes 224, termination tubes 324, inlet tubes, outlet tubes, etc.

Figure 18E:
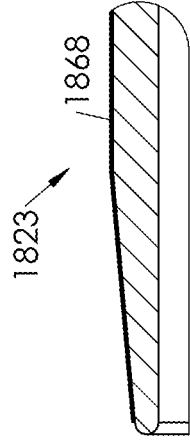
FIGS. 18A-18G are cross-sectional views of hermetic tube joints positionable about the optical fibers.
Figure 18F:
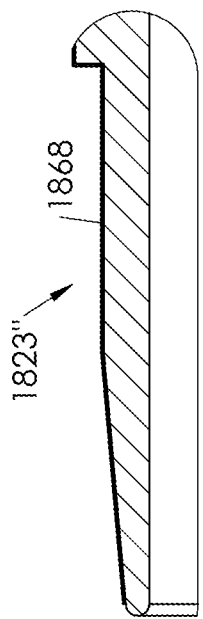
Figure 18G:
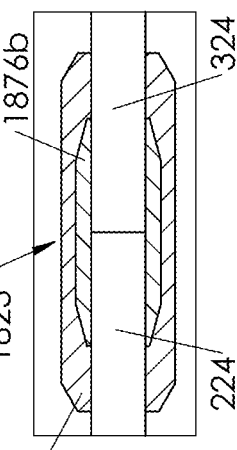
Figure 18A:
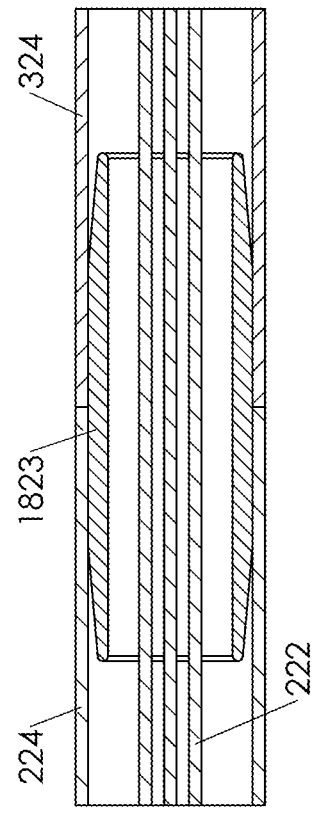

As shown in FIGS. 18A-18D, the tube joints 1823 are insertable within adjacent tubes for connection therebetween. The adjacent tubes may be, for example, a termination tube 324 positioned in abutting engagement with a cable tube 224 to receive the optical fibers 222 therefrom (but could be overlapped or other engagement). In the example of FIG. 18A and the detailed view of FIG. 18E, the tube joint 1823 has a tubular body with tapered ends to facilitate insertion into the adjacent tubes 224, 324. The optical fibers 222 pass from the cable tube 224 and through the tube joint 1823 and into the termination tube 324.

The tube joints 1823 may be rigid tubular bodies sealed about the tubes 224, 324 using various processes, such as laser beam welding, welding, ultrasonic welding, electron beam welding, brazing, soldering, bonding, etc. The tube joints may be made out of material with a thermal conductivity to protect the optical fibers 222 from temperature effects of tube joining processes. The material may also be used to achieve hermetic sealing between the cable tube 224 and the termination tube 324. Example materials that may be used include ceramic, high temperature plastic (e.g., PEI, PEEK, etc.).

As shown in FIGS. 18E and 18F, a coating, 1868, such as a metal (e.g., an electrostatic coating) or plastic (e.g., pliable polymer or silicone), may be applied and cured over at least a portion of the tube joint 1823, such as its outer surface. The cured coating may have a thickness in the order of few thousands of an inch (a few hundredths of a mm). The coating may be applied by a dipping, brushing, and/or spray coating process. The coating may be compatible with materials of the fiber optic cable, such as the gel, and/or with materials in the termination, such as fluid therein. The coating may also be capable of withstanding high temperature exposure.

As shown in FIG. 18A, the tube joint 1823 may be pressed into the cable tube 224 and the termination tube 324. The tube joint 1823 may have an interference fit engagement with an internal surface of the tubes 224, 324. The outer surface may compliantly deform to the tubes for sealing engagement therewith. The tube joint 1823 may be engaged longitudinally with both tubes 224, 324. About half of the tube joint may be pressed into each of the respective tubes 224, 324. The interference fit between tube joint 1823 and respective tubes may be, for example, about five percent. The length of engagement may be, for example, at least one or two times an internal diameter of the cable tube 224 and termination tube 324, respectively.

Figure 18B:
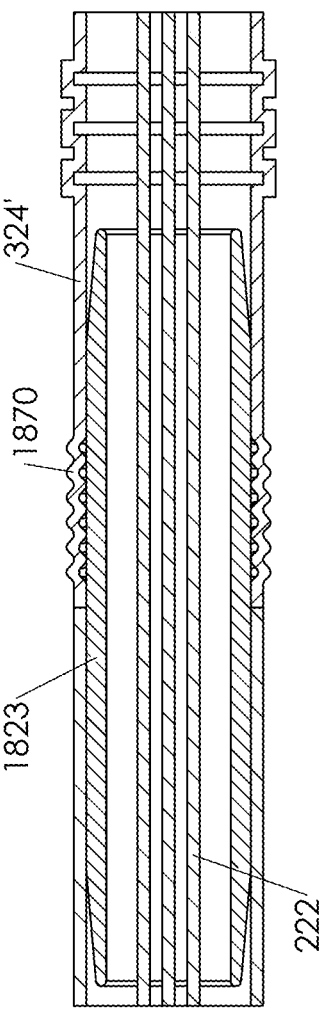

As shown by FIG. 18B, the tube joint 1823 may be used with a variety of tubes. In the example of FIG. 18B, the tube joint 1823 is positioned within a flexible termination tube 324'. The flexible termination tube 324' has a bellows-like sections 1870 therein to provide axial and radial compliance. In this example, the coating 1868 of the tube joint 1823 may locally deform along an inner surface of each ridge of the bellows to establish discrete sealing interfaces therebetween.

Figure 18D:
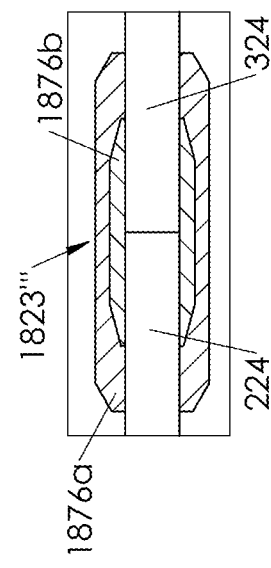
Figure 18C:
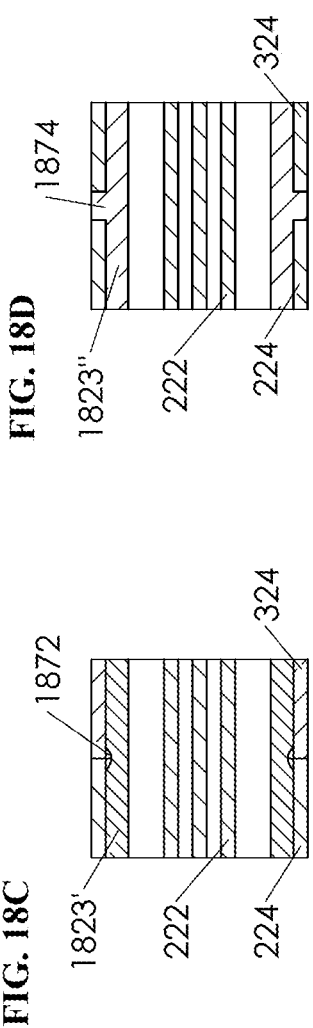

As shown by FIGS. 18C and 18D, the tube joint 1823 may be provided with various features. FIG. 18C shows the tube joint 1823' with a circumferential groove 1872 along an outer periphery thereof. The groove 1872 may align with adjoined ends of the adjacent tubes 224, 324. The tube joint 1823 may be coated along an outer surface thereof, except about the groove 1872.

As shown by FIG. 18D, the tube joint 1823" may be provided with a circumferential collar 1874 extending radially therefrom. The collar 1874 may be positioned between adjacent ends of the tubes 224, 324 to receivingly engage the ends of each tube. The collar may extend from the tube joint 1823" and align with each end of the tubes and the outer surfaces thereof. As shown in FIG. 18F, the coating 1868 may extend along the outer surface of the tube joint 1823" and the collar 1874.

FIG. 18G shows another tube joint 1823''' that may be used to seal adjacent tubes 224, 324. As shown in this version, the tubes 224, 324 may be hermetically sealed at their respective outer surfaces by the tube joint 1823'''. The tube joint 1823''' has an outer tube sleeve 1876a and an inner sleeve 1876b disposable about the tubes 224, 324. The inner sleeve 1876b is in sealing engagement across both ends of the adjacent tubes 224, 324 to seal the ends together. The outer sleeve 1876a surrounds the inner sleeve 1876b and seals with each of the tubes 224, 324.

The sleeves 1876a,b may be secured about the tubes 224, 324 and against external ambient pressure. Under the normal operating circumstance, with no failure of tube joint 1823''', the tube joint interface may be primarily sealed by the outer sleeve 1876a. The inner sleeve 1876b may serve as a redundant seal for reinforcement. The tube joint 1823' may be used alone or in combination with the tube joint 1823'''.

The tube joints described herein may be stretched substantially in a radial direction, due to the elastic properties of the seal material, over the hermetically joined tubes 224, 324. Dimensions of the seals may be configured for use with the desired tubes. For example, an inner diameter of the sleeves may be sized to provide sufficient sealing engagement under pressure.

FIGS. 19A-19F show additional versions of mechanically sealed (or non-hermetic) tube joints 1923 that may be used to seal tubes 224, 324. As shown in these versions, the tube joints 1923 are similar to the tube joint 1823, except with an additional crimp sleeve 1976. The crimp sleeves 1976 are sealed about an outer surface of the tubes to seal adjacent ends thereof. The outer tube joint 1923 may be sealed mechanically about the adjacent tubes using, for example, gland type seals and crimping.

Figure 19D:
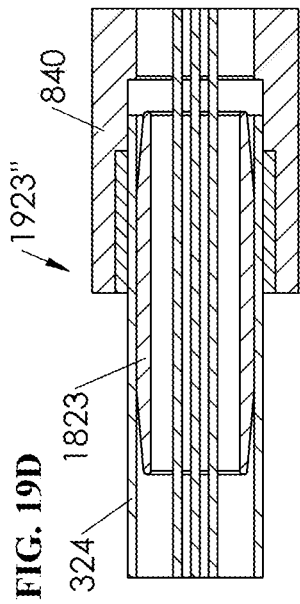
FIGS. 19A-19F are cross-sectional views of non-hermetic tube joints positionable about the optical fibers.
Figure 19E:
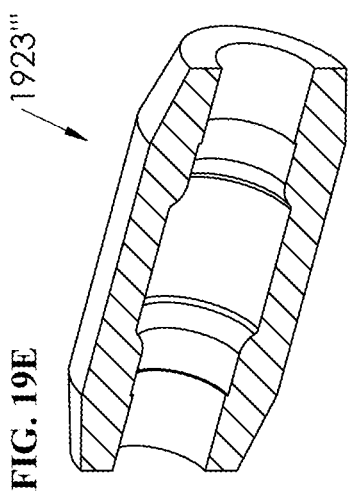
Figure 19F:
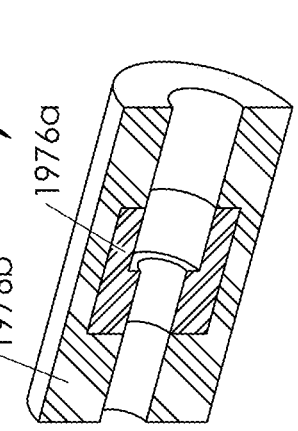
Figure 19A:
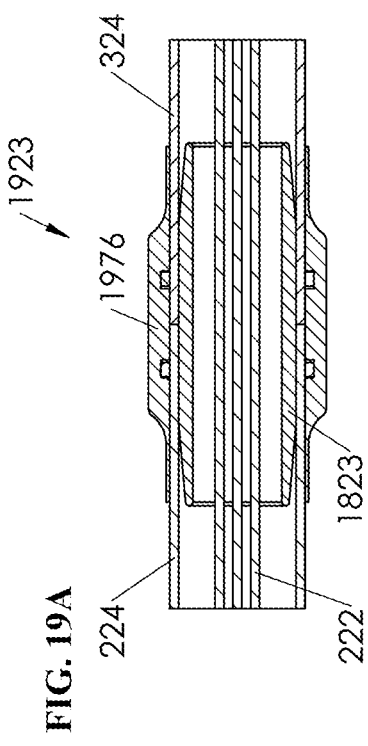
Figure 19B:
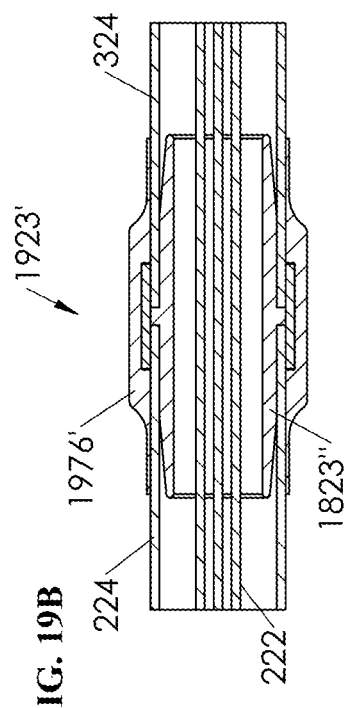

FIGS. 19A and 19B shows the tubular joints 1923, 1923' including tube joints 1823, 1823", respectively, positioned within the adjacent tubes 224,324 as previously described. These figures also show an outer crimp sleeve 1976, 1976' having an inner diameter to receive the adjacent ends of the tubes 224, 324 therein. The outer crimp sleeves 1976, 1976' have a raised outer surface with tapered ends. The outer crimp sleeves 1976, 1976' may have two inner seals (e.g., gaskets or gland seal) as shown in FIG. 19A, or a cylindrical inner seal as shown in FIG. 19B.

The crimp sleeves 1976, 1976' may be made out of a malleable material, such as stainless steel, compatible with the tubes. The crimp sleeves may have the coating 1868 along an inner surface thereof for sealing engagement with the tubes. The ends of the crimp sleeve 1976, 1976' may be crimped over the tubes to mechanically seal therewith.

Figure 19C:
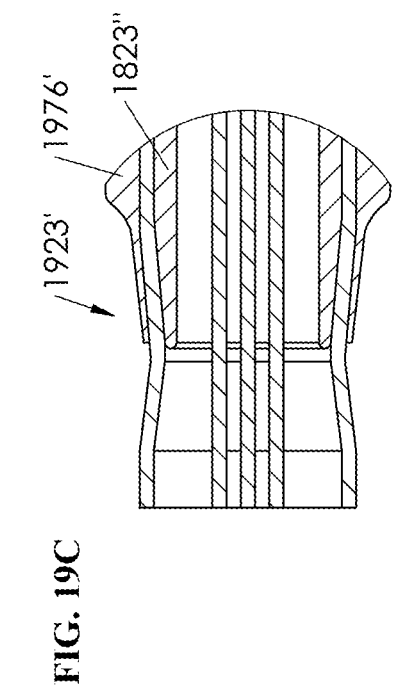

FIG. 19C shows the tube joint 1923' after crimping. As shown in FIG. 19C, the crimp sleeve 1976' and tubes may plastically deform over the tube joint 1823 under crimping crush load that is applied substantially uniform around the circumference. This results in sealing engagement between inner diameter surface of the tube and taper end of the tube joint 1923'.

FIG. 19D shows another tube joint connection 1923" between a termination tube 324 and tube (or inlet) of a component, such as storage base 334. The tube of the component may be, for example, termination tubes in the form of tubular arms 840 of the storage base 334 as shown in FIG. 8. As shown in FIG. 19D, the tubes are joined in sliding engagement. Such sliding engagement may be used, for example, where axial compliance between the tubes may be needed to prevent loading on optical fibers 222. In this version, the tube joint 1823 is provided within a first of the tubes (e.g., termination tube 324). An end of this first tube is receivable in a second tube (e.g., arm 840) having an inner diameter shaped to receive the outer diameter of the first tube. As shown, an additional seal may be provided between the tubes.

The tube joints 1923, 1923', 1923" may be provided with an external tube joint 1923''', 1923'''' as shown in FIGS. 19E and 19F, respectively. The tube joint 1923''' is a single sleeve shaped to receive the crimped tube joints of FIGS. 19A or 19B and provide a redundant seal layer thereabout. The tube joint 1923"" has an inner sleeve 1976a and an outer sleeve 1976b sealingly positionable about an outer surface of the tubes of FIG. 19D. As shown, the inner and outer sleeves 1976a,b are stepped to conform to the dual diameters of the tubes. The inner and outer sleeves 1976a,b are also disposed about each tube to provide a seal thereacross similar to the dual sleeves of FIG. 18G.

The selected tube joint(s) may be provided with various combinations of the features provided in FIGS. 18A-19F. Various combinations of materials may also be used to facilitate operation of the tube joints. Other options may be provided with the non-hermetic tube joints. For example, bellows may be provided, with crimping performed in non-bellows portions of the tube joint. Sealing may also be provided using in-situ buildup of material using, for example, molding, casting and taping.

Multi-Termination Assembly

FIGS. 20A and 20B show an integrated fiber optic termination assembly 2002a,b. As shown in this version, multiple fiber optic terminations 102 may be coupled together to form a combined unit. The integrated fiber optic termination assembly 2002a,b may be used, for example, for complex optical signal communication system architecture. In the version of FIG. 20A, multiple terminations 102 are adjoined by an external housing 2028. This external housing 2028 is a cylindrical member (although other non-cylindrical members may be used) positionable about the terminations 102 and having a chamber therein to enclose the tube housing 328b.

The external housing 2028 encircles the tube housings 328b of the terminations 102 between the tapered portion 430a of the entry housing 328a and the manifold housing 328c. The external housing 2028 has an entry end shaped to enclose about the sealed connector 430b and a manifold end shaped to enclosed about the manifold 330a. As shown, the tube housing 328b is positioned within the external housing 2028, and the external housing 2028 may be perforated with holes to allow fluid therein.

Plates 2070 are disposed on opposite ends of the external housing to seal with the entry housing 328a and the manifold housing 328c. As shown, the plates 2070 may sealably receive the termination 102 without tube housing 328b. The plates 2070 may be structurally connected together by a rib 2071 and held in place with fasteners. A flexible bladder 2035 may be positioned within the external housing 2028 and/or encapsulate the entire assembly 2002a,b, there by forming a redundant protective layer.

The version of FIG. 20A is the same as FIG. 20B, except that the terminations 102 in this version have a modified disc-shaped storage 2034 positioned between the sealed connector 430b and the integral manifold 330a of multiple terminations 102 to defined a combined storage usable by the multiple terminations 102. Within the common fiber storage 2034, the optical fibers 222 from plurality of cables 121 may be spliced in various circuit combinations to achieve optical signal communication of a particular schematic arrangement. The external housing 2028 is shaped to receivingly engage the storage base 2034 to provide support thereto. As shown by FIGS. 20A and 20B, respectively, the terminations 102 may have a dedicated or a combined storage.

The housing 2028 and the plates 2070 are rigid bodies that may be formed from the same material as housing 328. Materials may include metals (e.g., super duplex stainless steel alloys, titanium alloys, nickel and chromium based alloys, austenitic stainless steel alloys and/or other corrosion resistant materials), nonmetallic materials (e.g., thermoplastics grade varying from industrial, engineering to advanced engineering plastics, ABS, PET, PTFE, PEI and PEEK).

Fiber Optic Methods

FIG. 21 is a flow chart depicting a method 2100 of assembling and using the protective fiber optic termination, respectively. As shown in FIG. 21, the method 2100 involves 2170 connecting (e.g., bonding) the receiving portion 1765a to the connecting portion 1765b of an optical contact 336, 2172 connecting optical fibers 222 to the optical contact (e.g., by passing an optical fiber into the receiving portion 1765a and connecting the optical fiber to the receiving portion 1765b), 2174 bonding optical fibers 222 in the contact portion (e.g., the connecting and receiving portions 1765a,b) (e.g., by applying epoxy and curing the optical fibers).

The method 2100 also involves 2176 passing (e.g., threading) the bonded optical fibers 222 through the termination tube 324, and 2178 adhering the bonded optical fibers 222 to the optical contact (e.g., receiving portion 1765a) to form a fiber subassembly. The method 2100 may also involve 2180 securing the connector housing 328e and the flexible housing 328d about the fiber subassembly. Portions 2170-2180 may involve forming a connector subassembly 2181.

The method 2100 also involves 2182 passing the optical cable 121 into the housing(s) (e.g., 328a-c), 2184 exposing an inner layer of the optical cable 121, and 2186 passing the inner layer 226 of the optical cable into the storage base 334. The housing(s) may be connected together with the optical cable 121 extended therein to form a manifold subassembly 2189. For assembly purposes, one or more housings 328a-c may be partially assembled (e.g., without bladder 435) and/or 2187 partially opened to expose the storage base 334 and the manifold 330a,b for connection.

The method also involves 2188 passing the optical fibers 222 through the manifold 330a,b and into the storage base 334, 2190 splicing the optical fibers 222 from the contact subassembly with optical fibers in the optical cable together within the storage base 334, and 2192 sealing the housings about the spliced optical fibers. The bladder 435 and housing 328b may be sealed about the assemblies and pressurized.

As indicated by the brackets, the method 2100 may be performed such that portions of the termination may be pre-terminated in subassemblies for quick connection.

Figure 22A:
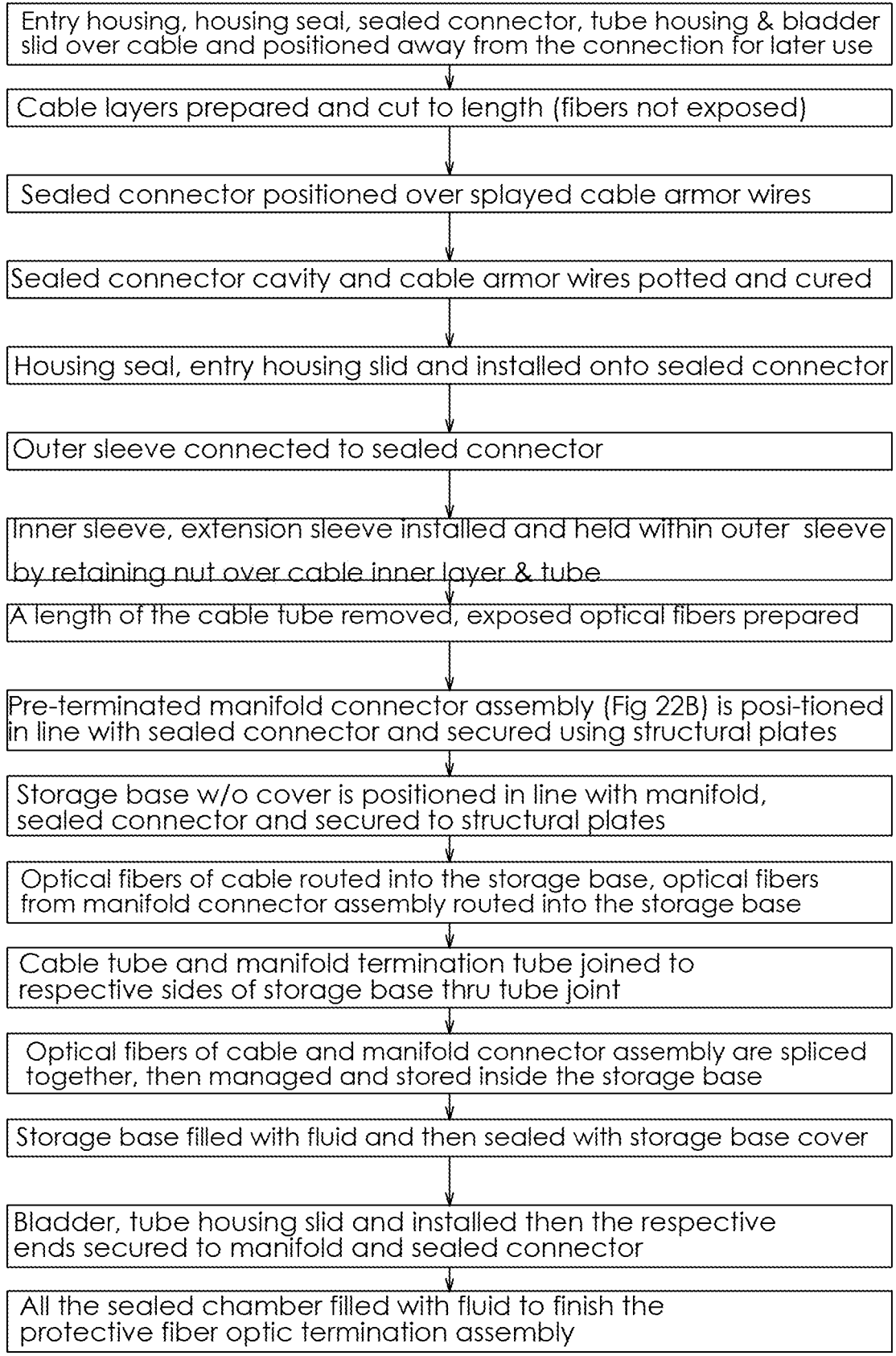
FIGS. 22A and 22B are flow charts depicting additional methods of assembling a protective fiber optic termination.
Figure 22B:
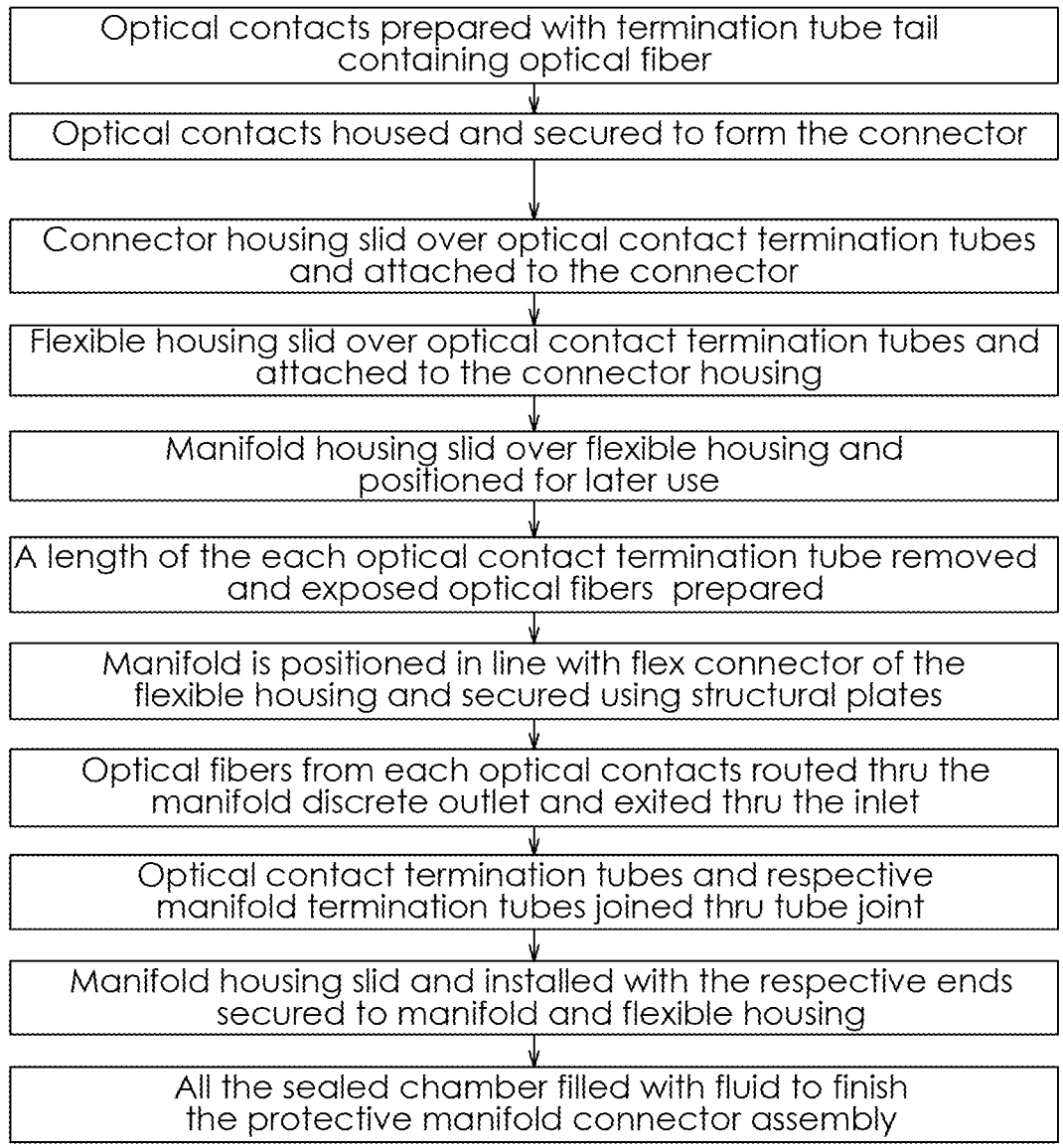

FIGS. 22A and 22B show additional views of example methods usable with the fiber optic termination. These figures describe additional optional activities that may be performed in the assembly, installation and use of the fiber optic termination.

Part or all of the method(s) may be performed in any order and repeated as desired.

Multi-Link Termination

FIGS. 23-34 relate to a multi-link termination usable with a multi-link cable having multiple communication links, such as fiber optic (with optical fibers), electrical (with wires and/or conductors), "electro-optical" (with optical fibers and wires/conductors), and/or other lines capable of passing signals. The multi-link termination is designed to sealingly receive the mutli-link cable and protectively distribute various communication links of the multi-link cable for communicative coupling with various equipment. The multi-link termination may operate similarly to the fiber optic termination of FIGS. 1-22 for communication between a source (e.g., light, power, etc.) and equipment a distance therefrom. Such communication between the source and the equipment may be provided by sealingly connecting (or coupling) the multi-link cable to such equipment using the protective multi-link termination.

Figure 23:
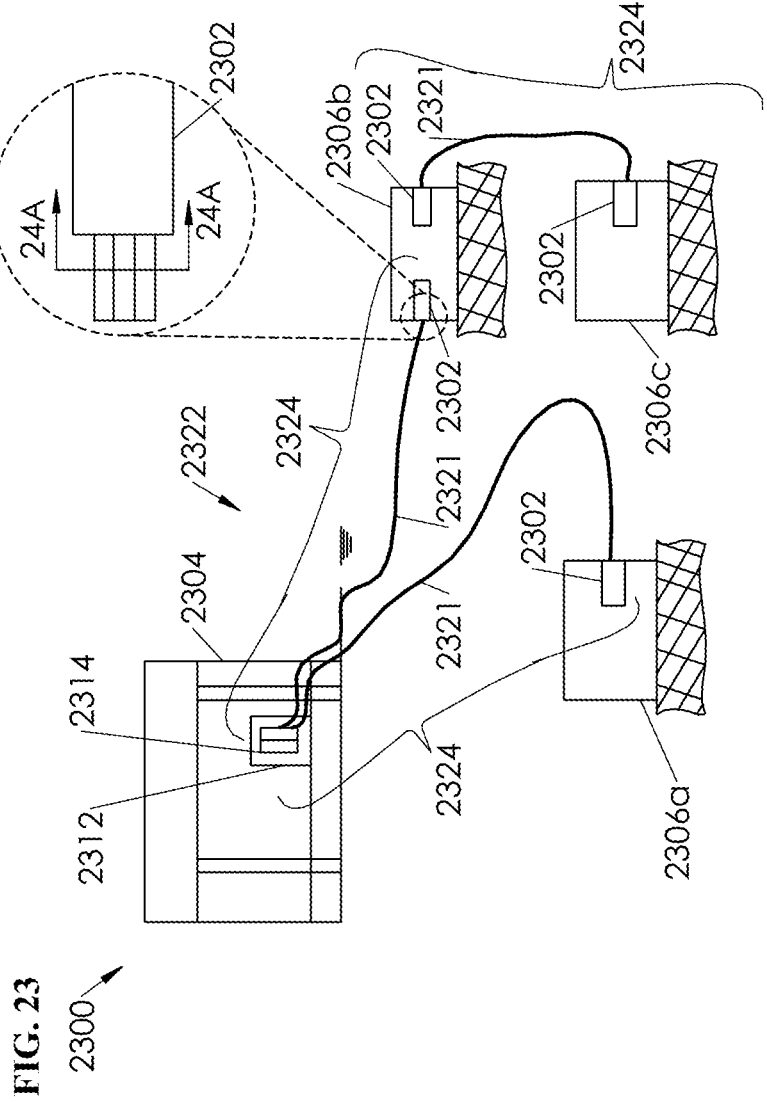
FIG. 23 is a schematic diagram depicting an equipment site with multiple equipment units, the equipment site having a multi-link communication system including sources, communication cables, and multi-link terminations.

FIG. 23 depicts another example environment 2300 in which various terminations, such as those disclosed herein, may be used. In this example, base equipment 2304 is connected to remote equipment 2306a-c by a communication system 2322. The base equipment 2304 and remote equipment 2306a-c may include one or more pieces of wellsite or other equipment. Such equipment may be used to perform electrical, hydraulic, mechanical, and/or other operations.

In this example, the base equipment 2304 is connected to the remote equipment 2306a-c by the communication system 2322 to form communication couplings 2324 therebetween. One or more communication couplings 2324 may be defined between one or more of the base equipment 2304 and/or the remote equipment 2306a-c. As shown, the base equipment 2304 is coupled via the communication couplings 2324 to remote equipment 2306a,b, and remote equipment 2306b and 2306c are coupled together by another communication coupling 2324. The communication couplings 2324 may be similar to the fiber optic couplings 124 of FIGS. 1-22, and/or other electrical, hydraulic, or other couplings, for passing data, power, control, and/or other signals therebetween.

The base equipment 2304 may have a base (or surface) unit 2312 (e.g., a CPU similar to 112 of FIG. 1) and a source 2314 (e.g., a fiber optic light source similar to 114 of FIG. 1). The communication system 2322 may be coupled between the source 2314 at the base equipment 2304 and the remote equipment 2306a-c via the communication coupling 2324 for communication therebetween.

The communication system 2322 includes one or more cables 2321 and/or terminations 2302 connectable between the various equipment for passing signals therebetween. The terminations 2302 may be positioned about (e.g., coupled to or positioned in) the base unit 2304 and/or the remote equipment 2320a-c. Each cable 2321 may be coupled to the equipment by the termination 2302 to form the communication coupling 2324. The terminations 2302 may also be coupled to the source 2314 and/or other base equipment 2304 by the cable 2321 for operation therewith. The cable 2321 may be connected between the source 2314 and the termination 2302 and/or between the remote equipment 2306 and the termination 2302 for passing signals therebetween.

One or more terminations 2302 may be provided in the equipment for connection with one or more cables 2321. The termination 2302 may be a variety of devices capable of connecting the cable 2321 to the various equipment for operation (e.g., communication) therewith, such as the terminations described herein. The termination 2302 may be a protective termination provided with a housing having multiple barriers and/or may be sealed at atmospheric pressure.

Figure 24A:
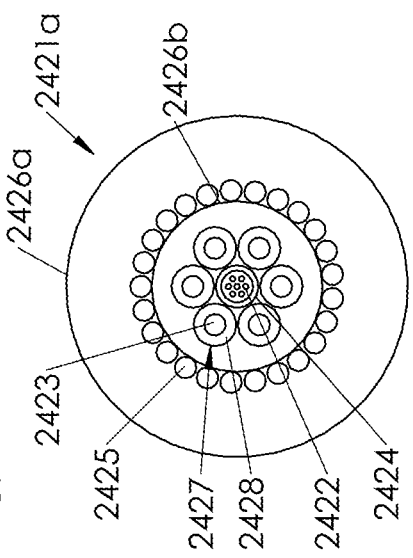
FIGS. 24A and 24B are cross-sectional views of example versions of multi-link cables.
Figure 24B:
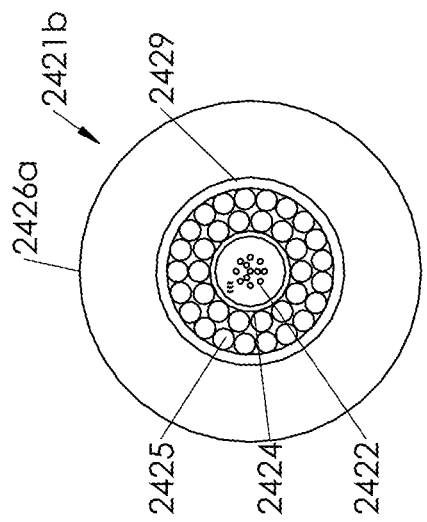

FIGS. 24A and 24B are cross-sectional views of various multi-link cables 2421a,b usable with the communications systems described herein. As shown by these examples, the cables usable with the communication systems herein may have various configurations of optical, electrical, fiber, wire, and/or other types of links. As shown by these figures, various cables with various communication capabilities may be used. The cables 2421a,b shown in of FIGS. 24A and 24B may be similar to cables 221a,b, except with additional wires 2427, 2429 for an additional means of communication, such as electrical. As shown by the examples of FIGS. 24A,B, various types of links may be provided in the cable communication via the cable 2421a,b.

In the example of FIG. 24A, the cable 2421a includes optical fibers 2422, a cable tube 2424, and layers 2426a-b thereabout. The cable 2421a also includes electrical wires 2427 including insulation 2428 with conductors 2423 therein. The wires 2427 are positioned radially about the optical fibers 2422 and the tube 2424. Armored cables 2425 are distributed radially about layer 2426b between layers 2426a,b. Layers 2426a,b may be a plastic sheath or other cable material. Tube 2424 may have a gel to support the optical fibers 2422 therein.

In the example of FIG. 24B, the cable 2421b includes optical fibers 2422, cable tube 2424, and layer 2426a. The optical fibers 2422 are supported in tube 2424 with armored cables 2425 radially disposed thereabout. An electrical tube 2429 radially surrounds armored cables 2425. Layer 2426a concentrically surrounds the electrical tube 2429. Like wire 2427, electrical tube 2429 is capable of acting as an electrical conductor.

While FIGS. 2A, 2B, 24A, and 24B show example versions of a fiber optic cable and multi-link cables that may be used, the cable(s) may have various features, such as one or more optical fibers and/or wires within one or more tubes, a circular or non-circular cross section, one or more layers about one or more of the tubes, gel and/or other substance to support the optical fibers in the tubes, maintained pressure within the tubes. Examples of various fiber optic cables that may be used are commercially available from GENERAL CABLE™ at www.generalcable.com, from TYCO™ at www.te.com, and/or from PRYSMIAN CABLE MANUFACTURERS™ at www.prysmiangroup.com.

Figure 25A:
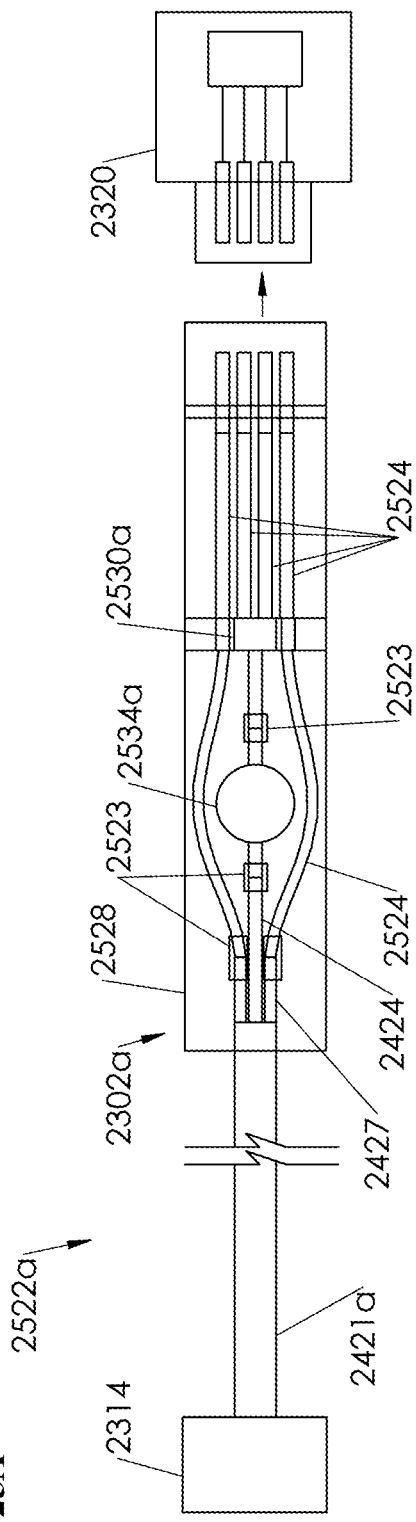
FIGS. 25A and 25B are schematic diagrams depicting example configurations of the fiber optic system of FIG. 23 with the multi-link termination in an electro-optical and processed configuration, respectively.
Figure 25B:
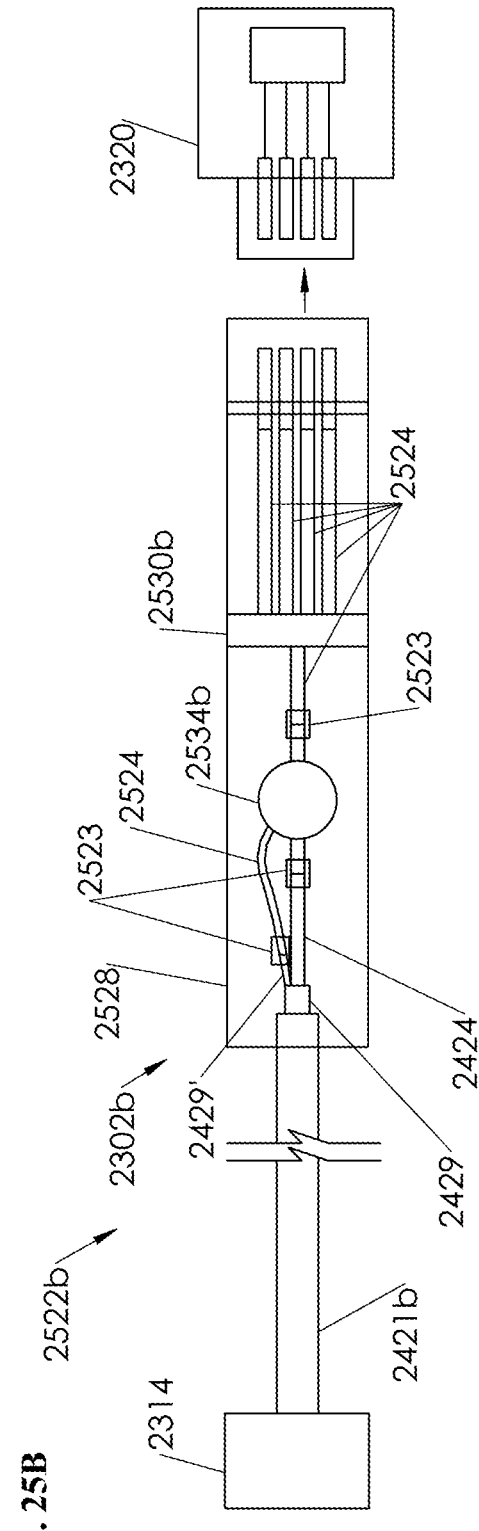

FIGS. 25A and 25B are schematic diagrams depicting example configurations of a portion of the multi-link communication system 2522a,b usable with multi-link cables, such as those of FIGS. 24A and 24B. These figures are similar to FIGS. 3A and 3B, except that the fiber optic terminations 2302a,b have been modified for use with the multi-link cables 2421a,b, respectively. In these examples, the cables 2421a,b extend from the source 2314, through housing 2528 of the termination 2302, and to the remote equipment 2320. Termination tubes 2524 and/or tube joints 2523 (which may be similar to termination tubes 324 and tube joints 323 of FIGS. 3A-3B) may be provided throughout the termination 2302a,b to seal the optical fibers 2422 and/or electrical wires 2427 extending from the cables 2421a,b.

In the example of FIG. 25A, the termination 2302a is in an electro-optical configuration with tube 2424 of cable 2421a passing into the housing 2528, and through the storage base 2534a and the manifold 2530a for connection to the remote equipment 2320. Tube 2424 is secured to one end of the storage base 2534a via tube joint 2523, and termination tubes 2524 are connected to another end of the storage base 2543 to sealingly house the optical fibers passing therethrough.

The wires 2427 of the cable 2421a extend from the cable 2421a, bypass the storage base 2534, and pass through manifold 2530a for connection to remote equipment 2320. The termination tubes 2524 are sealingly coupled to the wires 2427 via the tube joints 2523 to encase the wires 2427 extending through the termination 2302a. Optionally, additional termination tubes with additional wires may be spliced to the wires 2427 as is described further herein. One or more various types of tube joints capable of sealingly housing the wires may be positioned about splices as described further herein.

The termination 2302a and the manifold 2530a of FIG. 25A may be similar to the termination 102 and the manifold 330 of FIGS. 3A and 3B, except that the manifold 2530a may be provided with additional passages to receive multiple tubes with fibers and/or wires therethrough. The optical fibers 2422 and the wires 2427 may be used to provide optical and electrical communication between the source 2314 and the equipment 2320.

In the example of FIG. 25B, the termination 2302b is in a processed optical configuration with tube 2424 and electrical wires 2427 of cable 2421b passing through the storage base 2534b for connection therein. The optical fibers of tube 2424 pass through the storage base 2534b and the manifold 2530b for connection to the remote equipment 2320 as described in FIG. 25B. In this version, the cable 2421b has a tubular conduit 2429 extending from the cable 2421b. A wire 2429' is coupled to the tubular conduit 2429 and passes through a termination tube 2524 and to the storage base 2534b. The tube joints 2523 may optionally be provided to couple the termination tubes 2524 surrounding wire 2429' to the storage base 2534b and/or other devices. The termination tubes 2524 may also extend from the storage base 2534b and through the manifold 2530b for connection to the equipment 2320. The wire 2429' may be coupled to the storage base 2534b and/or components therein for providing power and/or electrical signals thereto.

While FIGS. 25A and 25B show specific examples with optical fibers passing through the storage base 2534 and one or more wires that may or may not pass through the storage base 2534a,b. One or more of various cables and/or communication links (e.g., fibers, wires, tubes, cables, and/or other connectors) may be provided for connection with various parts of the termination(s). Various portions of the terminations 2302a,b, may also be modified for operatively supporting the cable and portions thereof as is described further herein.

FIGS. 26A-26C show cross-sectional views of example multi-link terminations 2302a-c, respectively, for operative use with the multi-link cable. FIG. 26A depicts the multi-link termination 2302a in the electro-optical configuration. FIG. 26B depicts the multi-link termination 2302b in the processed optical configuration. FIG. 26C shows another version of the multi-link termination 2302c in an electrical configuration without a storage base.

Referring first to the termination 2302a of FIG. 26A, this termination 2302a may be similar to the termination 102 of FIG. 4B, modified for connection of the multi-link cable 2421a in the electro-optical configuration. This version includes the housing 2528 having modular portions including an entry housing 2528a, a tube housing 2528b, a manifold housing (or tube) 2528c, a flexible housing 2528d, and a connector housing 2528e. The housing 2528 may be similar to the housing 328 of FIG. 4B, adjusted for use with the multi-link cable 2421a.

As shown in greater detail in FIG. 27A, a modified sealed connector 2730b1 is coupled between a tapered portion 2730a of the entry portion 2528a and the tube housing 2528b. The tapered portion 2730a and the sealed connector 2730b1 may be similar to the tapered portion 430a and the sealed connector 430b of FIG. 4A and 4B, except that the sealed connector 2730b1 has been modified to pass multiple fibers and/or wires from the cable 2421a therethrough. The cable 2421a is receivable through the tapered portion 2730a with armored cables 2425 and portions 2426b of the cable 2421a such that the tube 2424 and wires 2427 extend therefrom into the sealed connector 2730b1.

In this version, the modified sealed connector 2730b1 has a modified retaining nut 2739d with passages 2731b1, b2 to receive tube 2424 and wire 2427 therethrough. The retaining nut 2739d includes an outer portion 2733a and an inner portion 2733b. The outer portion 2733a is shown in greater detail in FIG. 27A. The inner portion 2733b is shown in greater detail in FIG. 27B.

A passage 2731a extends into subpassage 2731b1 for receiving the tube 2424 containing optical fibers 2422 therethrough, and into subpassages 2731b2 for receiving the wires 2427 therethrough. The subpassage 2731b1 extends through the inner portion 2733b of the retaining nut 2739d. The subpassages 2731b2 extend through the outer portion 2733a of the retaining nut 2739d. The outer portion 2733a has tubular arms 2840a extending a distance from the retaining nut 2739d to support the wires 2427 and/or for connection with tube joints 2523a.

Figure 28B:
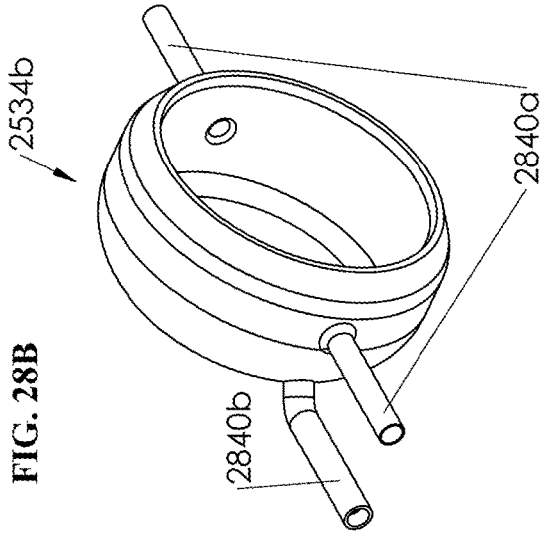
FIG. 28B is a perspective view of a mutli-link fiber storage base of FIG. 26B.
Figure 28A:
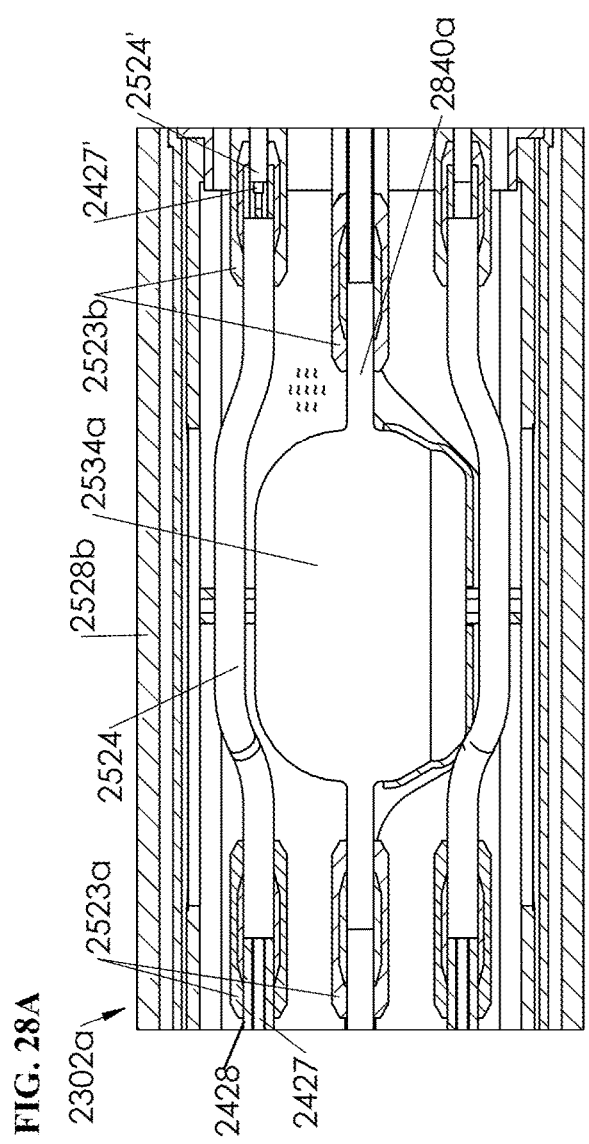
FIG. 28A is a cross-sectional view of a manifold and tube portion of the multi-link termination of FIG. 26A.

FIG. 28A shows a tube housing 2528b of the termination 2302a. The optical fibers 2422 may pass through the storage base 2534a as previously described, for example, in FIGS. 7 and 8. As shown by the example of FIG. 28A, the wires 2427 of cable 2421a may extend through the tube housing 2528b and bypass the storage base 2534a. The insulation layer 2428 of wire 2427 may be sealed with the termination tubes 2524 via tube joint 2523a. The additional wires 2427' surrounded by termination tubes 2524' may be spliced with the original wire 2427 and sealed with the termination tube 2524 via the tube joints 2523b to sealingly encase the wire 2427 therein.

The storage base 2534a may be similar to the storage base 334 of FIGS. 7 and 8. As shown by FIG. 28B, the storage base 2534b may include a circular portion with tubular arms 2840a extending therefrom. As also shown by FIG. 28B, the storage base 2534b may optionally be modified to include one or more additional arms 2840b for receipt of multiple wires of a multi-link cable. The additional arms 2840b may be used with the processed optical configuration of FIG. 26B as is described further herein.

Figure 29:
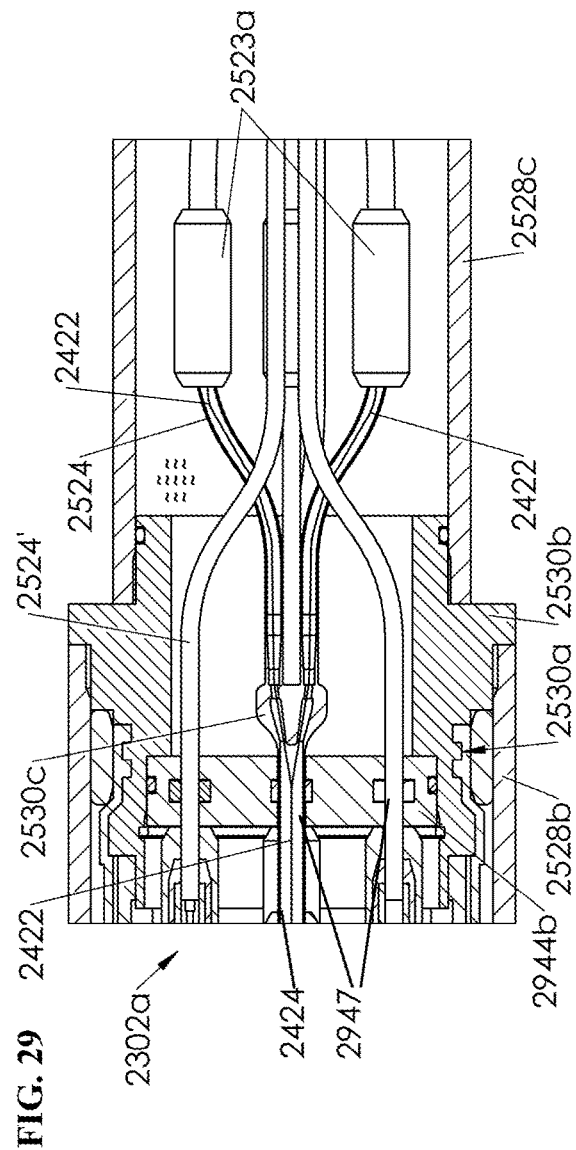
FIG. 29 is a cross-sectional view of a manifold portion of the multi-link termination of FIG. 26A.

FIG. 29 is a cross-sectional view of the tube and housings 2528b,c of the multi-link termination 2302a of FIG. 26A. As shown in this view, the termination 2302a may include manifolds 2944b, 2530b, c, which may be similar to the manifold 944b and 330b,c of FIG. 11A, except modified for use with a multi-link cable. The manifold 2530a is a plate manifold including a modified manifold base 2530b and a manifold cover 2944b. The manifold cover 2944b has been modified to include multiple passages 2947 to receive tubes 2424 therethrough. The termination tubes 2524' with wires 2427' therein pass from through the manifold cover 2944b, through the manifold base 2530b, and into the manifold housing 2528c. The termination tubes 2524 with fibers 2422 therein pass from the manifold cover 2944b, through the manifold base 2530b and into the manifold 2530c to distribute the optical fibers into termination tubes 2524 extending therefrom.

FIG. 30 is a cross-sectional view of the flexible and connector housings 2528d,e of the multi-link termination 2302a of FIG. 26A. The connector portion 2528e is similar to the connector portion 328e of FIG. 16A, modified for use with a multi-link cable. As shown in this view, the termination tubes 2524 with optical fibers 2422 therein extend from the manifold portion 2528c, through the flexible portion 2528d, and into the connector portion 2528e for connection to contacts 3036a. One or more of the termination tubes 2524 with various combinations of the optical fibers may be used for connection to the optical contacts 3036a. The optical contacts 3036a may be similar to the contact 336 of FIG. 17 for providing optical contact between the optical fibers of tube 2424 and the plug 2320 (FIG. 25A).

As also shown in FIG. 30, the termination tubes 2524' with wires 2427' therein extend from the manifold portion 2528c, through the flexible portion 2528d, and into the connector portion 2528e for connection to the electrical contacts 3036b. In this version, the wires 2427' are similar to wires 2427, but are separate wires spliced with wires 2427 to pass an electrical signal therethrough. One or more wires may optionally be spliced together as needed for connection and/or extension of the wires. Tube joints 2523c may be provided to seal the wires 2427' to the contacts 3036b for electrical connection thereto.

As shown in FIG. 31, the electrical contacts 3036b may be similar to the contact 336 of FIG. 17, but modified for electrical communication between the wires 2427' and plug 2320 (FIG. 25A). In this version, the electrical contact 3036b includes a receiving portion 3165a and a contact portion (or ferrule) 3165b. The contact portion 3165b may be a separate member receivable in the tubular receiving portion 3165a. The receiving portion 3165a may sealingly engage the portion contact 3165b. The contact portion 3165b extends from each end of the tubular receiving portion 3165a to electrically receive the wire 2427' at one end, and the plug 2320 of the remote equipment on the other end, for electrical communication therebetween. A receptacle 3167 may be positioned in an end of the contact portion 3165b to electrically receive the conduit 2423' of wire 2427'. A tip of the portion 3165b may extend from an end of the contact 3036b for electrical contact with the remote equipment. The electrical contact 3036b may be provided with insulation and/or conductive materials to prevent or facilitate electrical communication therebetween as needed.

Referring back to FIG. 26B, the termination 2302b is similar to termination 2302a of FIG. 26A, in the processed optical configuration. In this version, the connector 2730b1' has a retaining nut 2739d' similar to the retaining nut 2739d of FIGS. 27A-27C, except that the outer portion 2733a' has a singular subpassage 2731b for receipt of a wire 2427 from cable 2421a. In this version, the wire 2427 passes through the outer portion 2733a', through a tube joint 2523a and into arm 2840b of the storage base 2534b. The storage base 2534b is provided with an additional arm 2840b (see FIG. 28B) to separately receive the wire 2427 therein.

The storage base 2534b has electronics (e.g., a processor, PCB, power, signal processing, media convertor, opto-electronics etc.) 2640. Both the optical fibers 2422 and the wire 2427 of cable 2421a pass into the processor 2640. The optical fibers 2422 pass through the passage 2731a of the inner portion 2733b, and into the storage base 2534b via arm 2840a as previously described. The optical fibers 2422 may pass into the storage base 2534b to house a length of the optical fibers therein, and for optical connection to the electronics 2640. The wire 2427 may be used to provide power and/or communication signals to the processor 2640. The optical fibers 2422 may then extend from the electronics 2640 through the manifold 2530a' and to the connector portion 2528e as previously described. The manifold 2530a' is provided to isolate portions of the termination housing 2528b and to receive the termination tube 2524 with optical fibers 2422 therethrough.

Referring next to FIG. 26C, this termination 2302c is similar to the termination 2302a of FIG. 26A, except that no optical fibers or storage base are provided. In this version, the retaining nut 2739d" is similar to the retaining nut 2739d of FIG. 27A, except that the inner portion 2733b' has no passage 2731b1 therethrough. The wires 2427 exit the outer portion 2733a of the retaining nut 2739d' through termination tubes 2524, and are spliced with the additional wire 2427' housed in termination tubes 2524'.

As shown in FIGS. 28A and 28C, wires 2427 may be spliced to additional wires 2427', sealed with termination tubes 2524, 2524', and joined via tube joints 2523b for sealingly coupling therebetween. The tubes 2524' with wires 2427' therein may pass through the manifold 2530b, the flexible, and the connector portions 2528d,e for connection via contacts 3036, which may be similar to of FIGS. 16A,B.

Tube joints 2523a,b seal the termination tube 2524 to arms 2840a of the outer portion 2733a at one end, and to the termination tubes 2524' of wires 2427'. Wires 2427 are spliced to additional wires 2427' and joined via tube joints 2523a,b for sealingly coupling therebetween. The wires 2427' extend from the termination housing 2528b through manifold 2530a and to a connector housing (not shown), which may be similar to connector housing 2528e of FIG. 30, except with the optical contacts 3036a removed. Splicing as used herein refers to the operative connection, such as soldering, crimping, cold jointing, e-beam welding, etc., between wires and/or conductors to provide electrical communication therebetween.

FIGS. 32A and 32B show examples of electrical tube joints 2523a,b which may be used in the various terminations herein, such as those depicted in FIGS. 26A-26C. FIG. 32A shows an example tube joint 2523a for sealingly supporting wire 2427 with conductor 2423 (shown in hidden line within wire 2427) in an unexposed configuration within the sealed tube joint 2523a.

As shown in FIGS. 26A-C and 32A, the tube joint 2523a includes inner and outer portions 3276a,b sealably positionable about the wire 2427. In this version, the wire 2427 exits arm 2840 of the outer portion of the retaining nut 2427', and enters the termination tube 2524. The arm 2840 is matingly sealed within the termination tube 2524 to prevent exposure of the wire 2427. An outer diameter of the arms 2840 and the termination tube 2524 and of the inner diameter of the tube joint 2523a are in sealing contact.

FIG. 32B shows an example tube joint 2523b for sealingly supporting wires 2427, 2427' with conductors 2423, 2423' spliced together in an exposed configuration within the sealed tube joint 2523b. The conductor 2423 of the wire 2427 in the termination tube 2524 may be spliced with the conductor 2423' of the additional wire 2427' in tube 2524', and sealed with various tube joints, such as the tube joints 2523a,b of FIGS. 32A and 32B. These tube joints 2523a,b may be similar to the tube joints of FIGS. 18G, except that they are shaped to sealingly receive ends of adjacent electrical wires 2427, 2427'.

FIG. 32B shows a stepped version with wires 2427, 2427' of different gauges joined in a tube joint 2523b having a stepped inner diameter to receive the wires of different gauges. As shown in FIGS. 26A-C and 32B, the tube joint 2523a includes inner and outer portions 3276a',b',c sealably positionable about the ends of the adjacent wire 2427. In this version, the wire 2427 the termination tube 2524 is spliced with the additional wire 2427'. The conductor 2423 of the wire 2427 extends from the termination tube 2524 and the insulation 2428, and is exposed within the tube joint 2523b for splicing with a conductor 2423' of the wire 2427'. Similarly, the wire 2427' extends from the termination tube 2524' with the conductor 2423' exposed for splicing within the tube joint 2523b. The tube joint 2523b has a stepped inner diameter for sealingly engaging about the different outer diameters of the tubes 2524, 2524'. The inner and outer portions 3276a',b' of the tube joint 2523b are supplemented with an additional portion 3276c' to sealingly engage with both the termination tubes 2524, 2524'.

While FIGS. 32A,B show example tube joints 2523a,b usable for sealing about portions of wires 2427, 2427', other tube joints may be used, such as tube joint 2523c of FIG. 30. As shown by FIG. 30, a portion of the outer portion 3676a" of the tube joint 2523c may be modified to sealingly connect to other portions of the termination, such as the contacts 3036b and/or connector 2528e.

Figure 33:
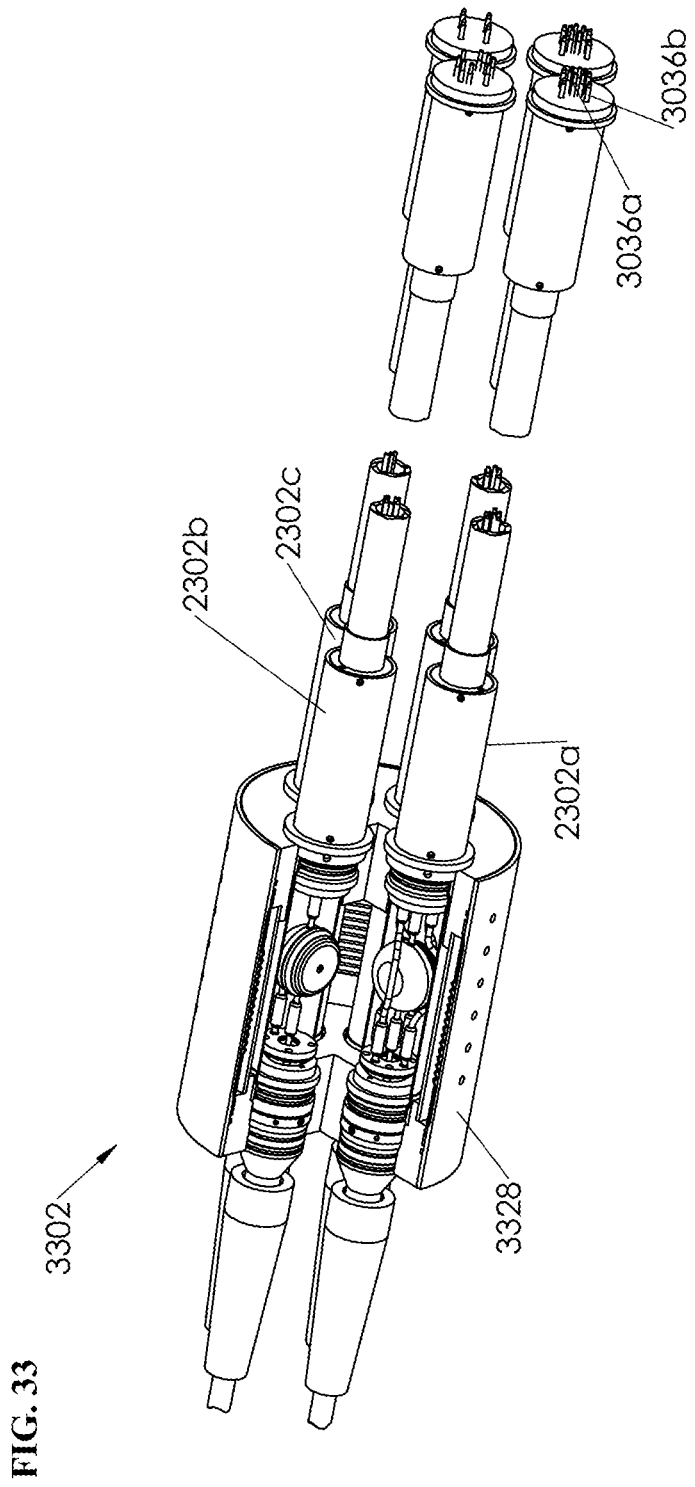
FIG. 33 is a perspective view of another fiber optic termination assembly comprising a plurality of multi-link terminations.

FIG. 33 is a perspective view of yet another termination assembly 3302 comprising a plurality of fiber optic terminations. This fiber optic termination assembly 3302 may be similar to the integrated fiber optic termination assembly 2002a of FIG. 20A for housing multiple terminations 2302a-c in housing 3328, except that one or more of the fiber optic terminations includes a multi-link termination 2302. In the example shown, the termination assembly 3302 includes the terminations 2302a, 2302b, and 2302c. Various combinations of one or more of the termination assemblies herein may optionally be provided. This view also shows the contacts 3036a,b for each of the multi-link terminations 2302a-c.

FIGS. 34A and 34B depict example methods usable with the terminations herein. FIG. 34A is a flow chart depicting a method 3400a of assembling a multi-link termination. The method 3400a is similar to the method 2100 of FIG. 21, except modified for use with the multi-link cable. As shown in FIG. 34, the method 3400 involves 3470 connecting (e.g., bonding) a receiving portion to a connecting portion of an optical contact and/or electrical contact, 3472 connecting optical fibers to the optical contacts and/or electrical wires to electrical contacts, 3474 bonding the optical fibers to the optical contacts and/or joining the electrical wires to the electrical contacts, 3476 passing the bonded optical fibers thru termination tube(s) and/or passing the joined electrical wires thru termination tube(s), 3478 adhering the bonded optical fibers to the optical contacts and/or electrical wires to the electrical contacts, and 3480 securing the connector housing and the flexible housing about the adhered optical fibers and optical contact, electrical wires and electrical contact.

The method 3400a continues with 3482 passing a multi-link cable into the housing(s), 3484 exposing an inner layer of the multi-link cable, 3486a passing the optical fiber cable tube of the multi-link cable into the storage base, 3486b passing the electrical wire of the electro-optic into the termination tube and/or storage base, 3487 exposing the storage base and the manifold, 3488a passing the optical fibers from optical contacts through the manifold and into the storage base, 3488b passing the electrical wires from electrical contacts through the manifold plate and into termination tubes, 3490a splicing the optical fibers from the optical contact with optical fibers in the cable tube of the multi-link cable within the storage base and sealing the storage base, 3490b splicing the electrical wires from the electrical contact with electrical wires in the multi-link cable within the termination tubes and sealing the termination tube joint, and 3492 sealing the housings about the spliced optical fibers and electrical wires with fluid fill and seals.

FIG. 34B shows another version of a method 3400b of using a multi-link termination. As shown in this view, the method 3400b involves 3471 providing a fiber optic termination comprising a sealed housing, a manifold, termination tubes, and optical contacts. The method further involves 3473 passing the optical fibers into an entry end of the sealed housing, 3475 distributing the optical fibers through the manifold, 3477 communicatively connecting the optical fibers to the contacts, 3479 (optionally) communicatively connecting additional optical fibers between the optical fibers and the contacts and/or an additional electrical wire between the electrical wire and the contacts, 3481 sealingly encasing the optical fibers in the termination tubes and sealingly connecting the termination tubes with at least one cable tube, the manifold, and the contacts, 3483 communicatively connecting the optical contacts to the equipment, and 3485 passing signals between the equipment and the cable via the optical fibers.

The sealingly encasing may involve sealingly positioning tube joints about the termination tubes and at least one of the at least one cable tube and the contacts, and the sealiningly connecting may involve welding, soldering, bonding, and/or joining. The fiber optic termination may also comprise a storage base, and the method may also involve passing the optical fibers into the storage base. The method may also involve communicatively connecting additional optical fibers between the optical fibers and the contacts, passing the electrical wire through the sealed housing and communicatively coupling the electrical wire to the contacts, sealingly encasing the electrical wire in the termination tubes and sealingly connecting the termination tubes with at least one cable tube, the manifold, and electrical contacts, communicatively connecting an additional electrical wire between the electrical wire and the electrical contacts, communicatively connecting the electrical contacts with the equipment, and/or providing power to the termination via the electrical wire.

Portions of the methods provided herein may be used alone or in combination, in any order, and repeated as desired.

While the embodiments are described with reference to various implementations and exploitations, it will be understood that these embodiments are illustrative and that the scope of the inventive subject matter is not limited to them. Many variations, modifications, additions and improvements are possible. For example, various combinations of one or more of the features and/or methods provided herein may be used.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter. For example, while certain connectors are provided herein, it will be appreciated that various forms of connection may be provided.

Insofar as the description above and the accompanying drawings disclose any additional subject matter that is not within the scope of the claim(s) herein, the inventions are not dedicated to the public and the right to file one or more applications to claim such additional invention is reserved. Although a very narrow claim may be presented herein, it should be recognized the scope of this invention is much broader than presented by the claim(s). Broader claims may be submitted in an application that claims the benefit of priority from this application.

What is claimed is:

1. A termination for communicatively connecting a cable to equipment, the cable comprising a casing having wires therethrough, the termination comprising:
    a sealed housing defining a sealed chamber and having an inlet to sealably receive an end portion of the cable, a cover of the wires having been removed at the inlet, the wires extendable from an end of the cable into the sealed chamber;

at least one retaining nut positionable in the sealed housing, the retaining nut having a single nut inlet to sealably receive the wires of the cable, a plurality of outlets to pass the wires therethrough, and paths extending from the nut inlet to each of the plurality of outlets, the paths shaped to distribute the wires from the inlet and through the plurality of outlets when in use;

at least one connector positioned about the sealed housing, the connector comprising contacts communicatively connectable to the equipment, each of the contacts connectable to the wires extending from a corresponding one of the plurality of outlets; and termination tubes positionable within the sealed chamber of the sealed housing to define sealed channels to receive the wires therethrough, a portion of the termination tubes sealingly connectable between each of the plurality of outlets of the retaining nut and a corresponding one of the contacts, the wires disposable through the sealed channels whereby the sealed housing, retaining nut, and the termination tubes define a multi-layer protective environment for sealingly encasing the wires.

2. The termination of claim 1, wherein the sealed housing comprises an entry housing, a housing tube, a manifold housing, a flexible housing, and a connector housing.

3. The termination of claim 1, wherein the sealed housing comprises a plurality of sealed chambers.

4. The termination of claim 3, wherein the plurality of sealed chambers comprises at least one bladder having a pressurized fluid therein.

5. The termination of claim 4, wherein the bladder is pressure balanced with a pressure outside of the sealed housing.

6. The termination of claim 1, wherein the termination tubes are pressure isolated from a pressure of the sealed chamber and a pressure outside of the sealed housing.

7. The termination of claim 1, further comprising at least one storage base positioned in the sealed housing, the storage base having a storage chamber to receive portions of the wires therein.

8. The termination of claim 1, further comprising tube joints sealably positionable about ends of the termination tubes and at each of the plurality of outlets of the retaining nut, the contacts, another termination tube, and combinations thereof.

9. The termination of claim 7, further comprising electronics positioned in the storage base, the electrical wire operatively connectable to the electronics.

10. The termination of claim 1, further comprising tube joints mechanically or hermetically sealed about the termination tubes.

11. The termination of claim 1, wherein the contacts comprise an outer portion supported by the connector and a ferrule positioned about an end of the outer portion, the ferrule communicatively connectable to the equipment and the wires, the outer portion sealingly connectable to the termination tubes.

12. A system for communicating with equipment, the system comprising:
a source;
a cable comprising a casing having at least one wire therethrough, the at least one wire having wires extending therethrough; and
a termination as in claim 1.

13. The system of claim 12, wherein the equipment comprises a base equipment and at least one remote equipment, the termination connectable to at least one of the base equipment and the at least one remote equipment.

14. A method of communicating between equipment via a cable, the cable comprising a casing having wires therethrough, the method comprising:
providing a termination comprising a sealed housing, at least one retaining nut, termination tubes, and contacts;
sealingly receiving an end of the cable through an inlet of the sealed housing;
removing a cover of the wires at the inlet and passing the wires from the cable and into the inlet of the sealed housing;
passing the wires sealably through single nut inlet of the retaining nut;
distributing the wires from the nut inlet and through paths extending from the nut inlet to a plurality of outlets of the retaining nut;
passing the wires from each of the plurality of outlets, through termination tubes, and to the contacts;
communicatively connecting the wires from each of the outlets to a corresponding one of the contacts;
sealingly encasing the wires in the termination tubes;
sealingly connecting portions of the termination tubes with each of the plurality of outlets of the retaining nut and the contacts; and
communicatively connecting the contacts to the equipment; and passing signals between the equipment and the cable via the wires.

15. The method of claim 14, wherein the sealingly encasing comprises sealingly positioning tube joints about the termination tubes and each of the plurality of outlets of the retaining nut and the contacts.

16. The method of claim 14, wherein the sealingly connecting comprises welding, soldering, bonding, joining, and combinations thereof.

17. The method of claim 14, wherein the termination further comprises a storage base, the method further comprising passing the wires into the storage base.

18. The termination of claim 1, wherein the cable is in sealing engagement with the housing.

19. The termination of claim 1, wherein the retaining nut has a solid body with paths extending therethrough between the inlet and the plurality of outlets, and wherein the paths are shaped to distribute the wires from the single nut inlet and through the plurality of outlets.

20. The termination of claim 1, wherein a portion of the termination tubes defines a first tubular channel sealingly connectable to the casing at one end and the single nut inlet at another end and another portion of the termination tubes defines a plurality of second tubular channels, and wherein each of the plurality of second tubular channels is sealingly connectable to one of the plurality of outlets of the retaining nut and a corresponding one of the contacts.

* * * * *